United States Patent
Lee et al.

(10) Patent No.: US 11,943,746 B2
(45) Date of Patent: *Mar. 26, 2024

(54) METHOD AND DEVICE FOR TRANSMITTING AND RECEIVING HARQ FEEDBACK INFORMATION ON BASIS OF SCI FORMAT IN NR V2X

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,633

(22) Filed: Apr. 6, 2023

(65) Prior Publication Data

US 2023/0247587 A1 Aug. 3, 2023

Related U.S. Application Data

(63) Continuation of application No. 17/718,137, filed on Apr. 11, 2022, now Pat. No. 11,627,556, which is a (Continued)

(30) Foreign Application Priority Data

Oct. 25, 2019 (KR) .................. 10-2019-0133987
Oct. 30, 2019 (KR) .................. 10-2019-0136678

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04L 5/0053* (2013.01); *H04W 72/0446* (2013.01); *H04W 72/20* (2023.01)

(58) Field of Classification Search
CPC ... H04W 28/04; H04W 72/04; H04W 72/042; H04W 88/08; H04W 72/02; H04W 72/20;
(Continued)

(56) References Cited

U.S. PATENT DOCUMENTS

2019/0342910 A1* 11/2019 Cao .................. H04L 5/0091

OTHER PUBLICATIONS

3GPP TSG RAN WG1 Meeting #96, Athens, Greece, Feb. 25-Mar. 1, 2019, R1-1903071, Agenda Item: 7.2.4.1.5, Source: Huawei, HiSilicon, Title: Design and contents of PSCCH and PSFCH. (Year: 2019).*

* cited by examiner

*Primary Examiner* — Peter G Solinsky
*Assistant Examiner* — Sanjay K Dewan
(74) *Attorney, Agent, or Firm* — LEE, HONG, DEGERMAN, KANG & WAIMEY

(57) ABSTRACT

Provided are a method for a first device to perform wireless communication, and a device for supporting same. The method may include: receiving, from a second device, a first sidelink control information (SCI) through a physical sidelink control channel (PSCCH); receiving, from the second device, a second SCI through a physical sidelink shared channel (PSSCH) related to the PSCCH; determining a physical sidelink feedback channel (PSFCH) resource, based on an index of a slot and an index of a subchannel related to the PSSCH; and determining whether or not to transmit hybrid automatic repeat request (HARQ) feedback information for the PSSCH to the second device on the PSFCH resource, wherein a format of the second SCI is a first format which does not include location information of
(Continued)

the second device or a second format which includes location information of the second device.

20 Claims, 29 Drawing Sheets

Related U.S. Application Data continuation of application No. PCT/KR2020/013848, filed on Oct. 12, 2020.

(60) Provisional application No. 62/913,725, filed on Oct. 10, 2019, provisional application No. 62/927,679, filed on Oct. 29, 2019, provisional application No. 62/938,917, filed on Nov. 21, 2019.

(51) Int. Cl.
*H04L 5/00* (2006.01)
*H04W 72/0446* (2023.01)
*H04W 72/20* (2023.01)

(58) Field of Classification Search
CPC ............. H04W 72/0446; H04L 5/0007; H04L 1/1812; H04L 5/0053
USPC ........................................................ 370/329
See application file for complete search history.

FIG. 4
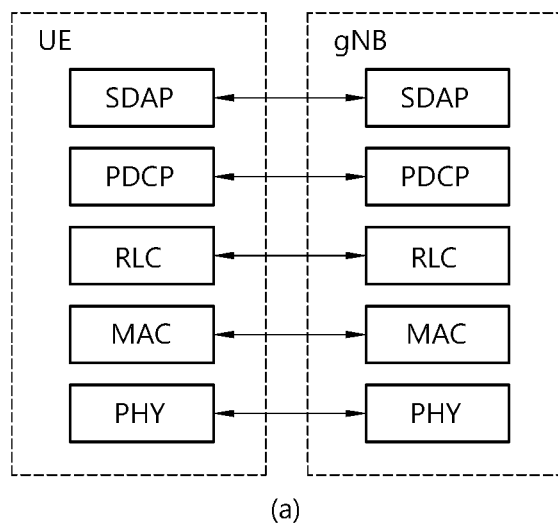
(a)
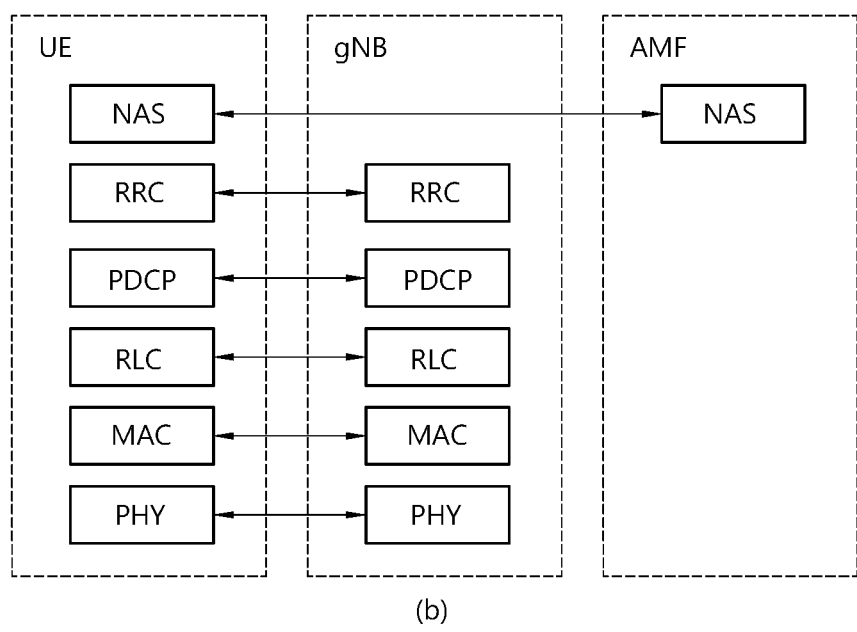
(b)

FIG. 8
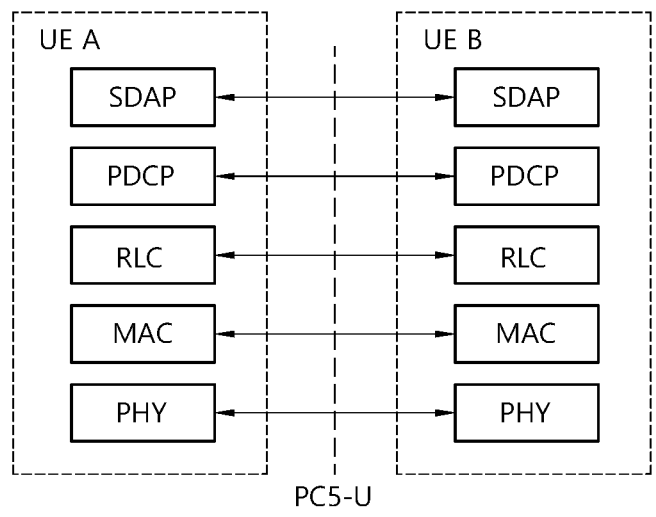
(a)
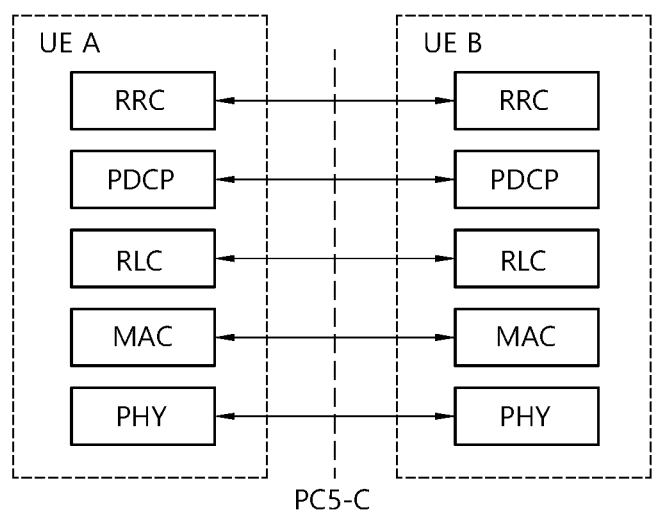
(b)

FIG. 13
(a) 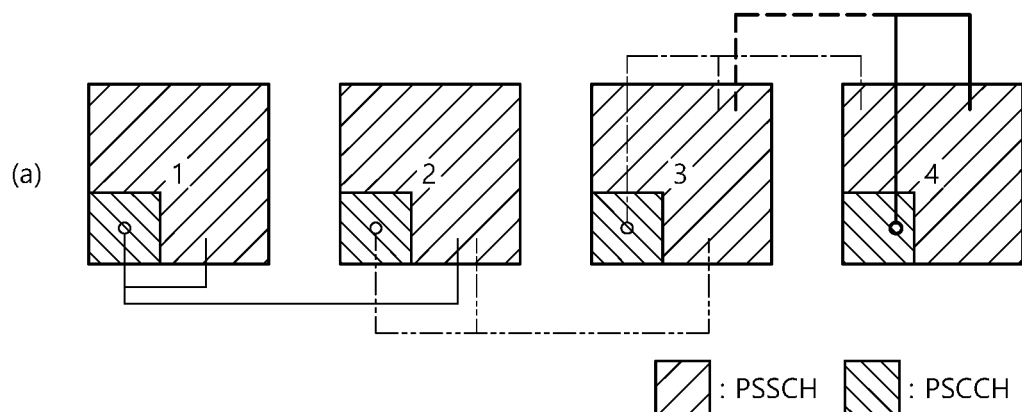
(b) 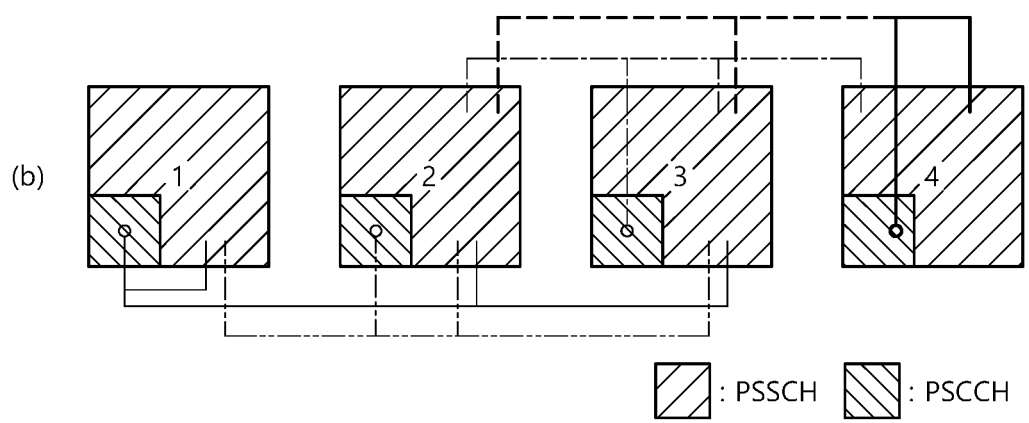
(c) 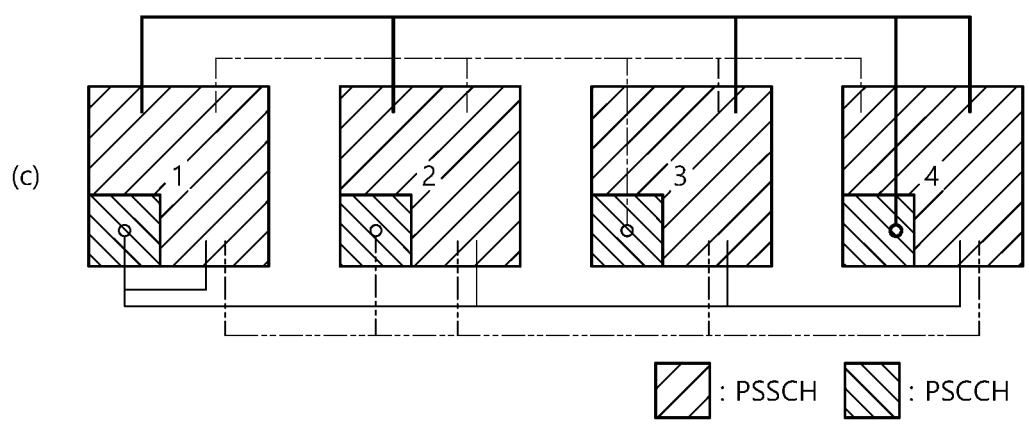

FIG. 18 transmit SL HARQ feedback information to base station through first resource — S1810

FIG. 19 receive SL HARQ feedback information from first device through first resource — S1910

# METHOD AND DEVICE FOR TRANSMITTING AND RECEIVING HARQ FEEDBACK INFORMATION ON BASIS OF SCI FORMAT IN NR V2X

CROSS-REFERENCE TO RELATED APPLICATIONS

This application is a continuation of U.S. patent application Ser. No. 17/718,137, filed on Apr. 11, 2022, which is a continuation of International Application No. PCT/KR2020/013848, filed on Oct. 12, 2020, which claims the benefit of earlier filing date and right of priority to Korean Patent Application Nos. 10-2019-0133987, filed on Oct. 25, 2019, and 10-2019-0136678, filed on Oct. 30, 2019, and also claims the benefit of U.S. Provisional Application No. 62/913,725, filed on Oct. 10, 2019, 62/927,679, filed on Oct. 29, 2019, and 62/938,917, filed on Nov. 21, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in NR V2X, a distance-based HARQ feedback operation may be supported. Accordingly, there is a need to propose a method for a transmitting UE to enable a distance-based HARQ feedback operation and an apparatus supporting the same. In addition, there is a need to propose a method for a receiving UE to determine whether to perform a distance-based HARQ feedback operation and an apparatus supporting the same.

Technical Solutions

In one embodiment, a method for performing, by a first device, wireless communication is provided. The method may comprise: receiving, from a second device, a first sidelink control information (SCI) through a physical sidelink control channel (PSCCH); receiving, from the second device, a second SCI through a physical sidelink shared channel (PSSCH) related to the PSCCH; determining a physical sidelink feedback channel (PSFCH) resource, based on an index of a slot and an index of a subchannel related to the PSSCH; and determining whether or not to transmit hybrid automatic repeat request (HARQ) feedback information for the PSSCH to the second device on the PSFCH resource, wherein a format of the second SCI is a first format which does not include location information of the second device or a second format which includes location information of the second device, and wherein, based on the format of the second SCI, the HARQ feedback information includes ACK or NACK, or includes only NACK.

In one embodiment, a first device configured to perform wireless communication is provided. The first device may comprise: one or more memories storing instructions; one or more transceivers; and one or more processors connected to the one or more memories and the one or more transceivers. The one or more processors may execute the instructions to: receive, from a second device, a first sidelink control information (SCI) through a physical sidelink control channel (PSCCH); receive, from the second device, a second SCI through a physical sidelink shared channel (PSSCH) related to the PSCCH; determine a physical sidelink feedback channel (PSFCH) resource, based on an index of a slot and an index of a subchannel related to the PSSCH; and determine whether or not to transmit hybrid automatic repeat request (HARQ) feedback information for the PSSCH to the second device on the PSFCH resource, wherein a format of the second SCI is a first format which does not include location information of the second device or a second format which includes location information of the second device, and wherein, based on the format of the second SCI, the HARQ feedback information includes ACK or NACK, or includes only NACK.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 13 shows a method in which a UE that has reserved transmission resource(s) informs another UE of the transmission resource(s), based on an embodiment of the present disclosure.

FIG. 18 shows a method for a first device to report SL HARQ feedback information to a base station, based on an embodiment of the present disclosure.

FIG. 19 shows a method for a base station to receive SL HARQ feedback information from a first device, based on an embodiment of the present disclosure.

DESCRIPTION OF EXEMPLARY EMBODIMENTS

Figure 1:
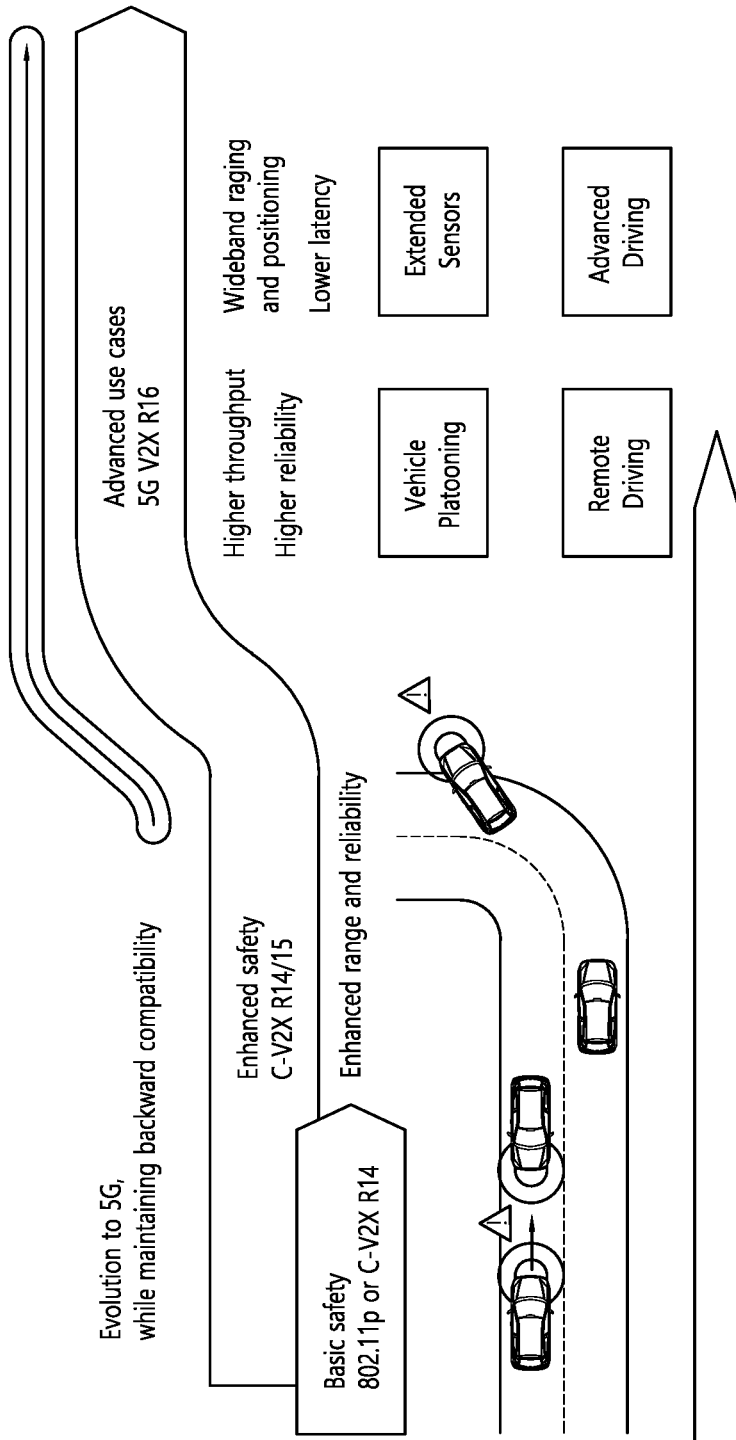
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet radio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
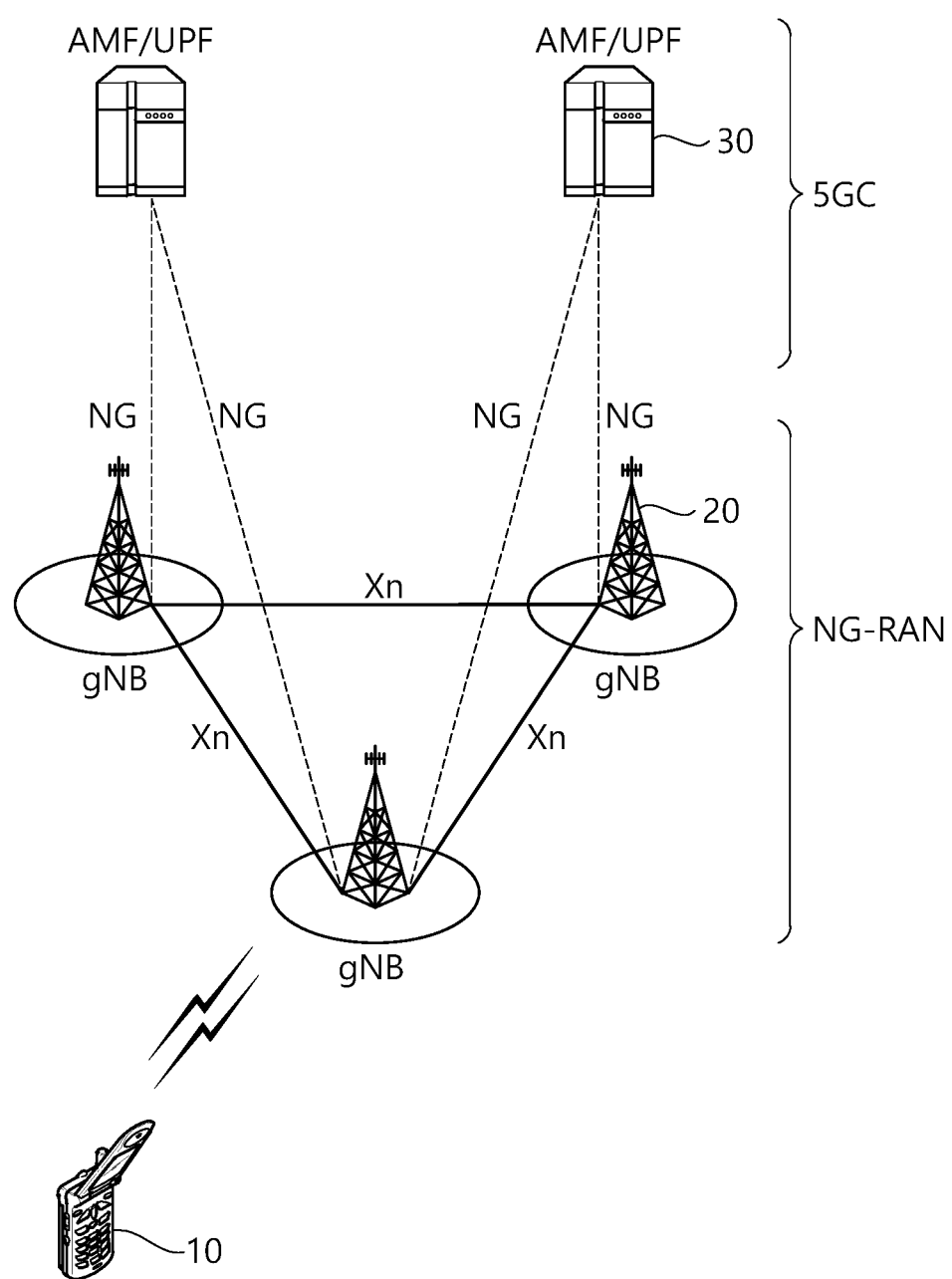
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
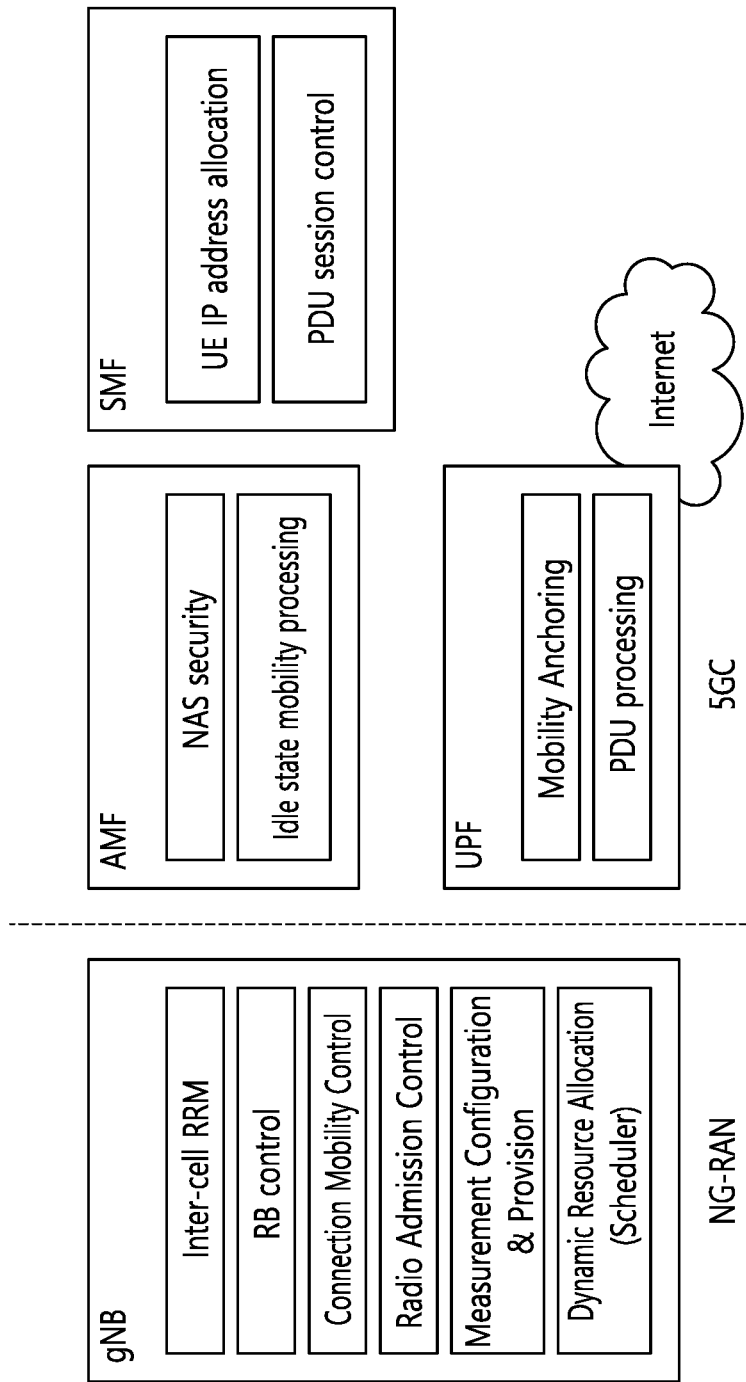
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
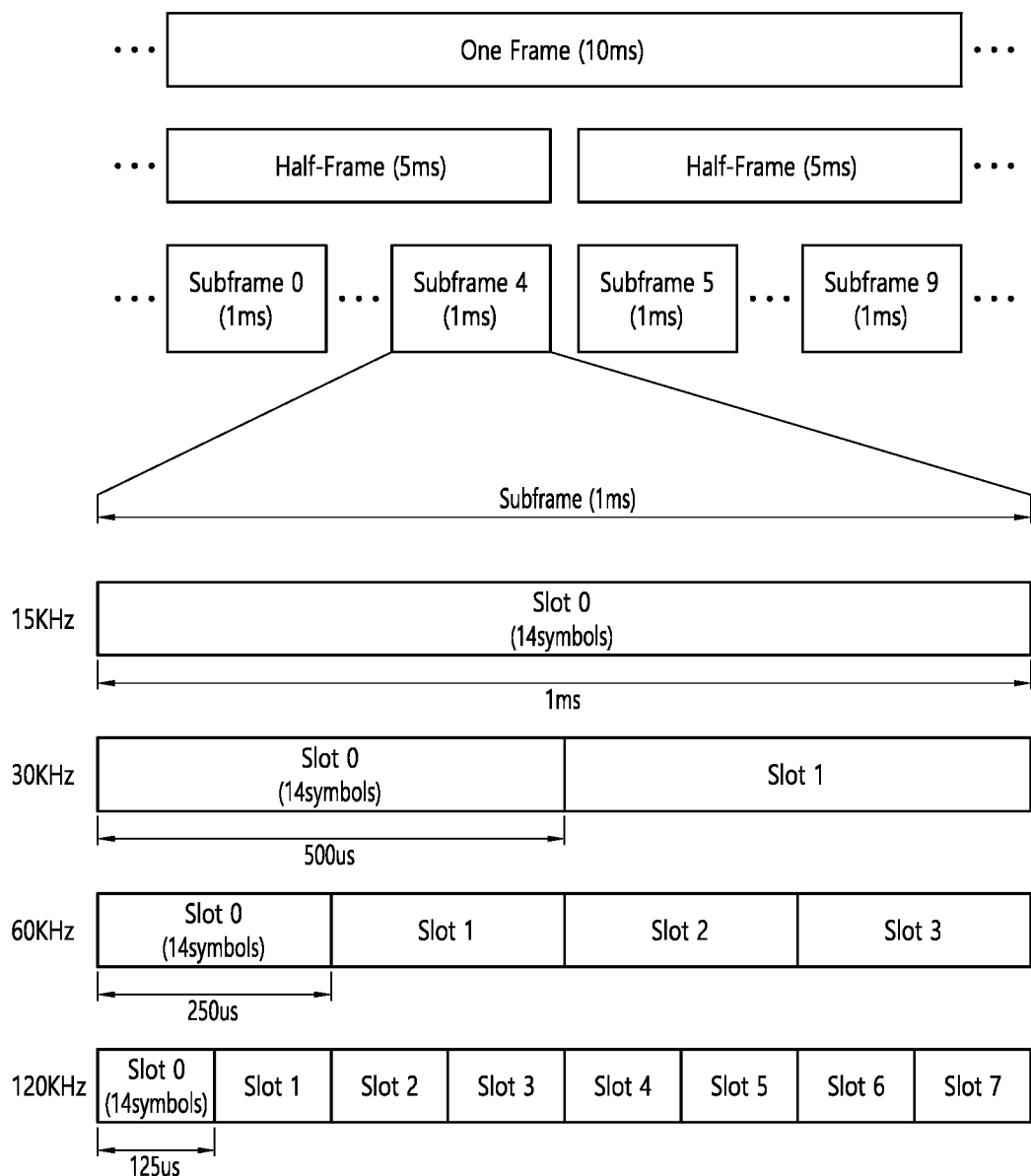
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
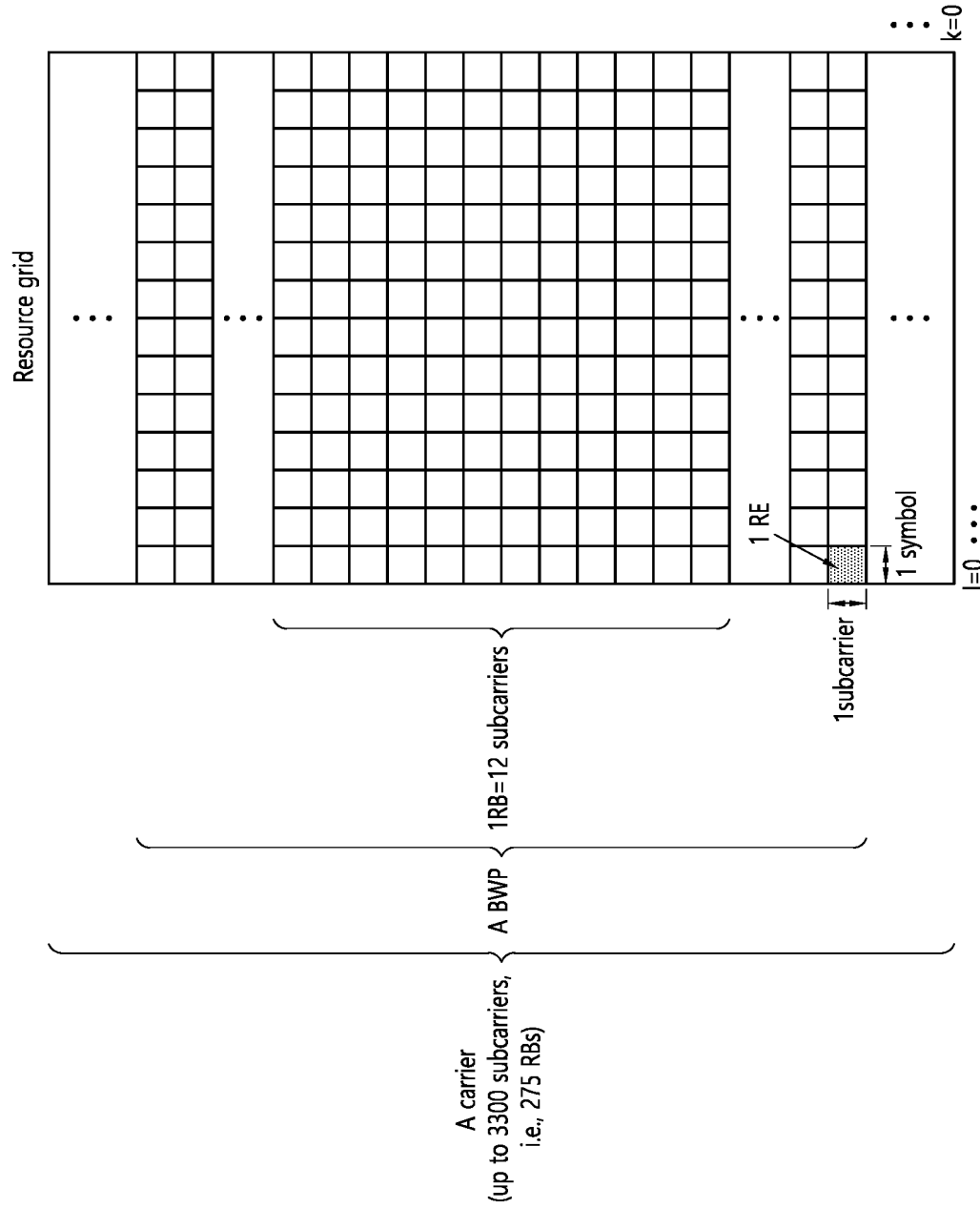
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
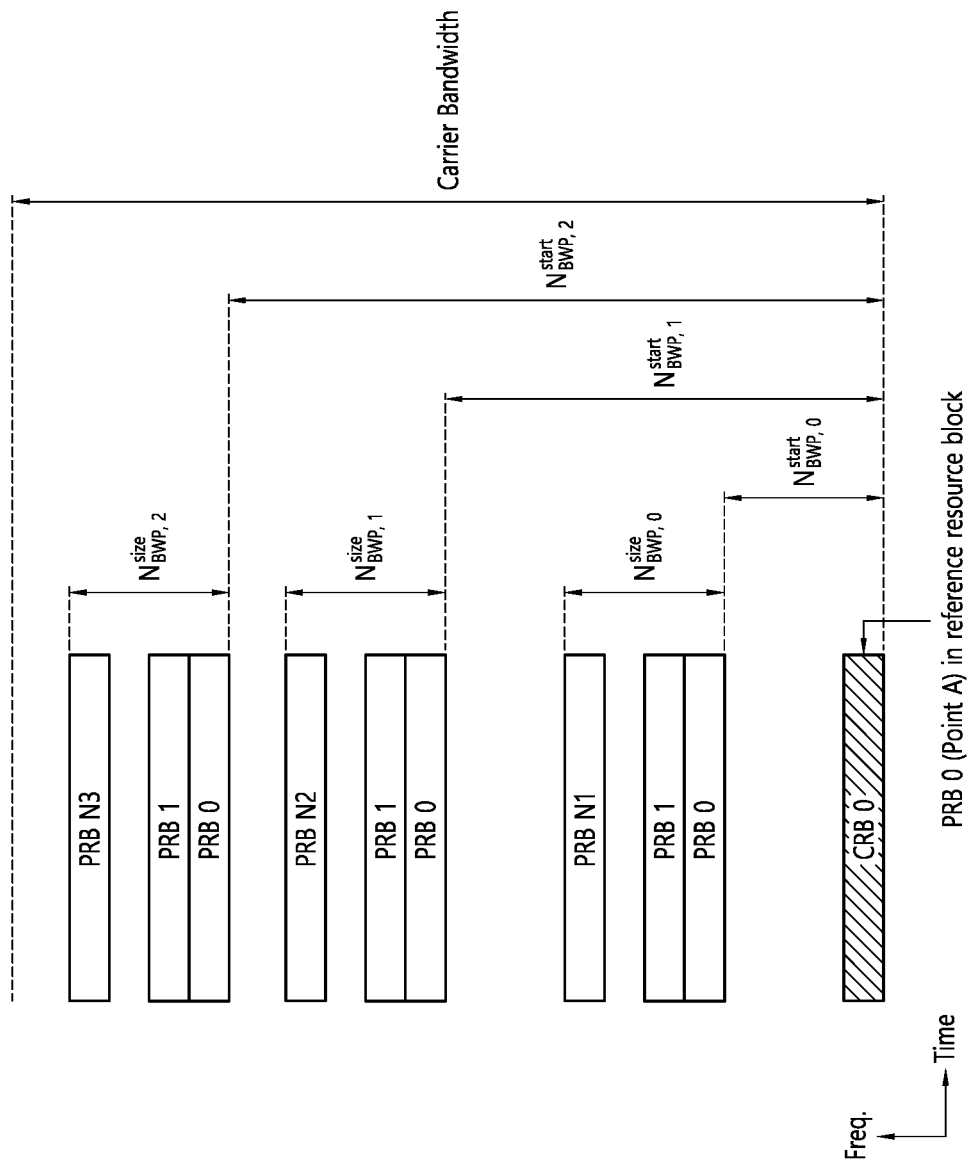
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
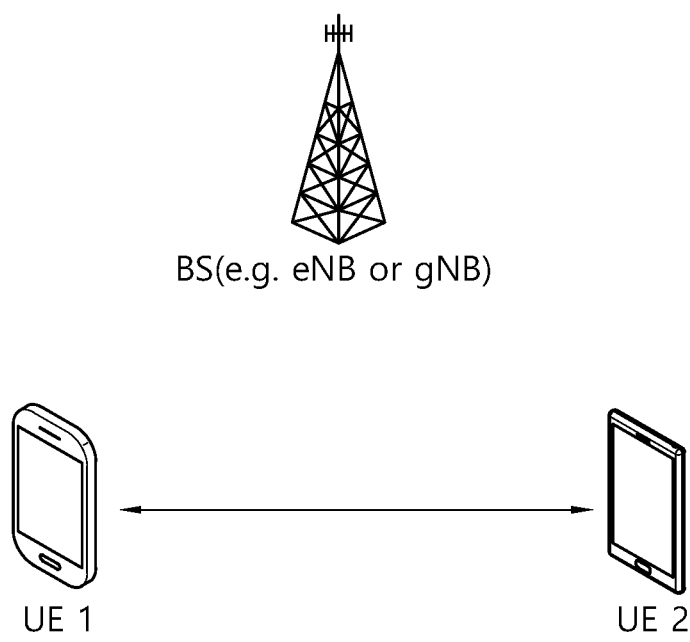
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
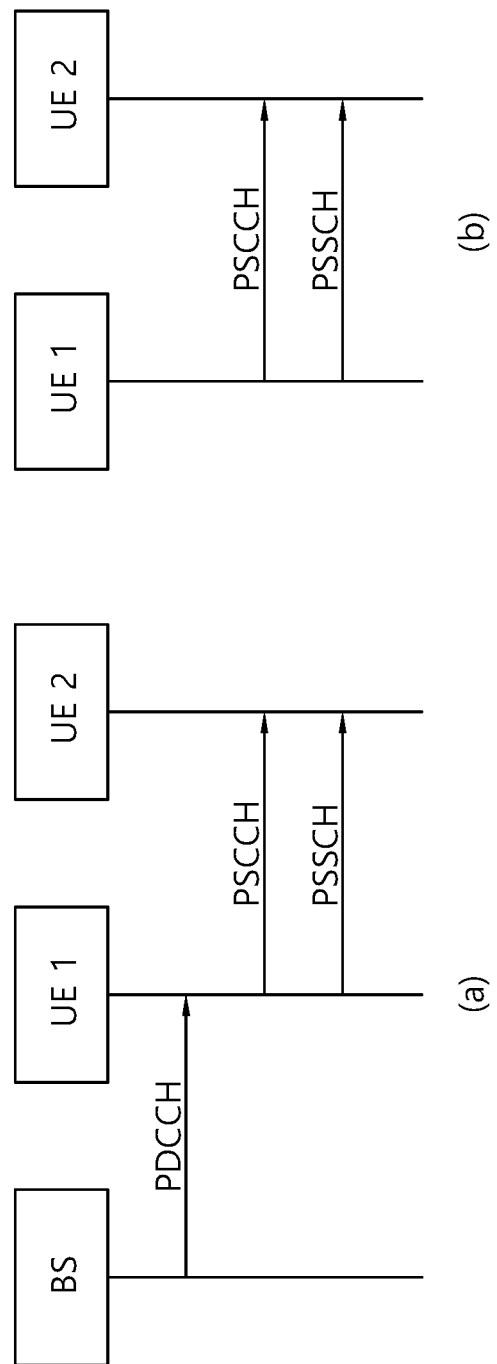
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
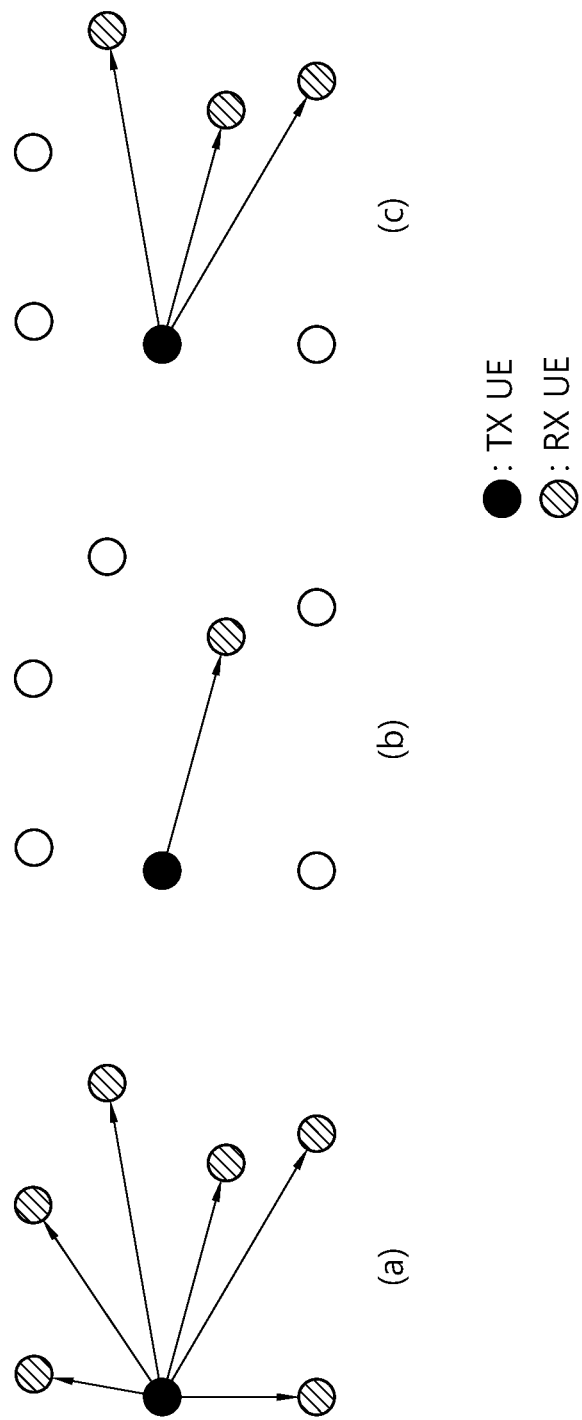
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
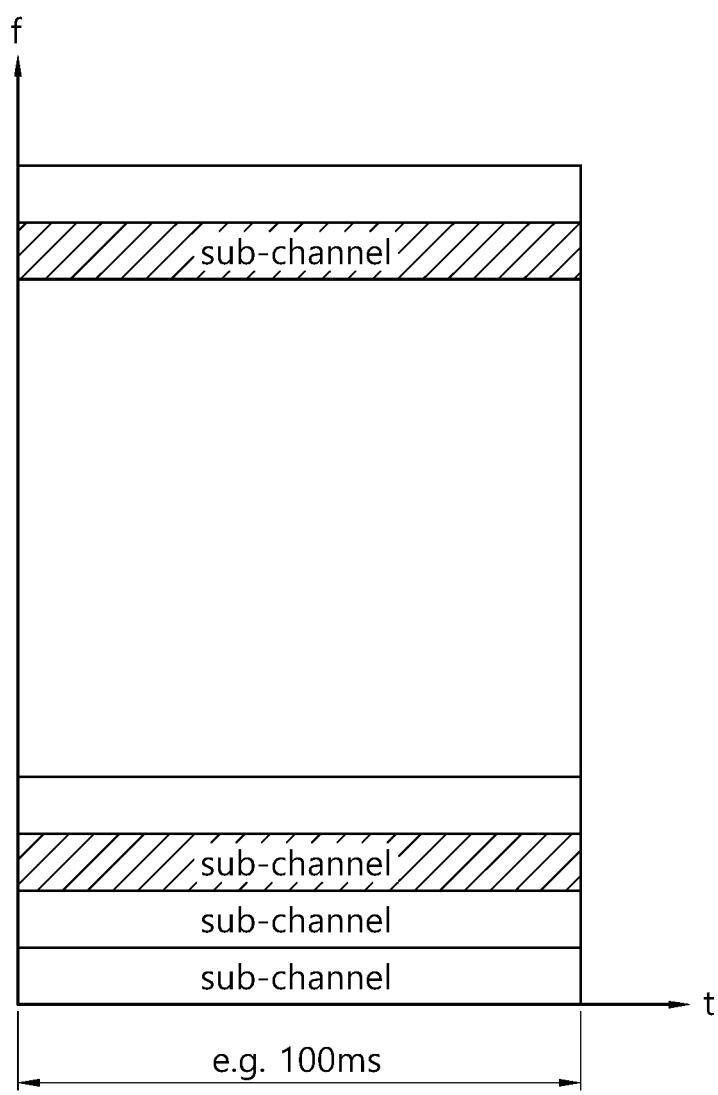
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g., packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal (DM-RS)) and/or a SL (L1) RSRP report request indicator, to the (target) RX UE, to be used for SL (L1) RSRP measurement. For example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE is a UE which transmits a SL (L1) RSRP measurement value, to the TX UE, measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, the TX UE may transmit at least one of the following information to the RX UE through SCI(s). Herein, for example, the TX UE may transmit at least one of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, a PSCCH may be replaced/substituted with a SCI and/or a first SCI and/or a second SCI, or vice versa. For example, the SCI may be replaced/substituted with the PSCCH and/or the first SCI and/or the second SCI, or vice versa. For example, since the TX UE may transmit the second SCI to the RX UE through a PSSCH, the PSSCH may be replaced/substituted with the second SCI, or vice versa. For example, if SCI configuration fields are divided into two groups in consideration of a (relatively) high SCI payload size, the first SCI including a first SCI configuration field group may be referred to as a $1^{st}$ SCI or $1^{st}$-stage SCI, and the second SCI including a second SCI configuration field group may be referred to as a $2^{nd}$ SCI or $2^{nd}$-stage SCI. For example, the first SCI may be transmitted through a PSCCH. For example, the second SCI may be transmitted through a (independent) PSCCH. For example, the second SCI may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool). For example, "that A is configured" may mean "that the base station/network transmits information related to A to the UE".

Meanwhile, in the present disclosure, for example, an RB may be replaced/substituted with a subcarrier, or vice versa. For example, a packet or a traffic may be replaced/substituted with a transport block (TB) or a medium access control protocol data unit (MAC PDU) based on a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol. For example, a PSSCH may be replaced/substituted with a PSCCH, or vice versa.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, time may be replaced/substituted with frequency, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in the present disclosure, a high priority may mean a small priority value, and a low priority may mean a large priority value. For example, Table 5 shows an example of priorities.

TABLE 5

| service or logical channel | priority value |
|---|---|
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 13 shows a method in which a UE that has reserved transmission resource(s) informs another UE of the transmission resource(s), based on an embodiment of the present disclosure. The embodiment of FIG. 13 may be combined with various embodiments of the present disclosure.

Specifically, for example, (a) of FIG. 13 shows a method for performing by a transmitting UE chain-based resource reservation by transmitting/signaling location information of (maximum) 2 transmission resources to receiving UE(s) through one SCI, in the case of a value of K=4. For example, (b) of FIG. 13 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 11, the transmitting UE may transmit/signal only location information of the fourth transmission-related resource to the receiving UE(s) through the fourth (or last) transmission-related PSCCH. For example, referring to (a) of FIG. 11, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 11, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 11, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 11, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 13 shows a method for performing by the transmitting UE block-based resource reservation, by signaling location information of 4 transmission resources to receiving UE(s) through one SCI, in the case of a value of K=4.

Meanwhile, for example, if the UE performs mode 1-based SL communication, the maximum number of retransmissions related to one TB of the UE may be limited. For example, if the UE performs mode 1-based SL communication, the maximum number of retransmissions related to a SL HARQ process of the UE may be limited. For example, if the UE performs mode 1-based SL communication, the maximum number of retransmissions related to a mode 1 configured grant (CG) of the UE may be limited. For example, if the UE performs mode 1-based SL communication, the maximum number of retransmissions related to a mode 1 dynamic grant (DG) of the UE may be limited. For example, the base station may limit the maximum number of retransmissions of the UE through pre-defined signaling (e.g., SIB, RRC, DCI, etc.). For example, the base station may transmit information related to the maximum number of retransmissions to the UE through pre-defined signaling. Hereinafter, for convenience of description, the maximum number of retransmissions may be referred to as MAX_RETXNUM. Hereinafter, for convenience of description, the UE performing mode 1-based SL communication may be referred to as a MODE 1 TX UE. For example, the MAX_RETXNUM may be the number of transmissions including both initial transmission and retransmission. Alternatively, for example, the MAX_RETXNUM may be the number of transmissions including only retransmissions, excluding initial transmissions.

For example, if the MAX_RETXNUM of the MODE 1 TX UE is limited, the MODE 1 TX UE may use resource(s) allocated by specific (one) mode 1 CG or mode 1 DG without distinguishing the initial/retransmission purpose related to one TB. And/or, for example, if the MAX_RETXNUM of the MODE 1 TX UE is limited, the MODE 1 TX UE may use resource(s) allocated by specific (one) mode 1 CG or mode 1 DG without distinguishing the initial/retransmission purpose related to a SL HARQ process. For example, as described above, if the MODE 1 TX UE does not distinguish the allocated resource(s) for the initial transmission purpose and the retransmission purpose and use it, it may be difficult for the base station to accurately determine how many retransmissions have already been performed by the (corresponding) MODE 1 TX UE or the number of remaining retransmissions with respect to (corresponding) one TB and/or a SL HARQ process when the MODE 1 TX UE requests additional retransmission resource allocation through a (pre-configured) PUCCH resource (e.g., a resource for the MODE 1 TX UE to report SL HARQ feedback information received from the RX UE to the base station) to the base station. In other words, for example, when the base station allocates additional retransmission resource(s) based on the PUCCH transmitted by the MODE 1 TX UE, it may be difficult for the base station to adjust the number of resources to be allocated for retransmission so as not to exceed the MAX_RETXNUM of the UE with respect to one TB and/or the SL HARQ process (described above). For example, the total number of retransmission resources allocated by the base station to the UE with respect to the specific TB and/or the SL HARQ may be greater than the MAX_RETXNUM.

Based on various embodiments of the present disclosure, a method for efficiently alleviating the above-described problem and an apparatus supporting the same are proposed.

For example, whether or not to apply all or part of the methods and/or procedures proposed according to various embodiments of the present disclosure may be configured or determined differently or limitedly according to at least one of a resource pool, a service type, a service priority, a cast type, a destination UE, a (L1 or L2) destination ID, a (L1 or L2) source ID, a (service) QoS parameter (e.g. reliability, latency), a (resource pool) congestion level, a SL mode (e.g., mode 1, mode 2), a grant type (e.g., CG, DG), and/or a size of a packet/message (e.g., TB). For example, whether or not to apply all or part of the methods and/or procedures proposed according to various embodiments of the present disclosure may be configured or determined differently or limitedly for at least one of a chain-based resource reservation operation of the TX UE, a block-based resource reservation operation of the TX UE, a blind retransmission operation of the TX UE, s SL HARQ feedback-based retransmission operation of the TX UE, a CG-based resource selection/reservation/determination operation of the TX UE, and/or a DG-based resource selection/reservation/determination operation of the TX UE.

For example, parameter(s) according to various embodiments of the present disclosure may be configured or determined differently or limitedly according to at least one of a resource pool, a service type, a service priority, a cast type, a destination UE, a (L1 or L2) destination ID, a (L1 or L2) source ID, a (service) QoS parameter (e.g. reliability, latency), a (resource pool) congestion level, a SL mode (e.g., mode 1, mode 2), a grant type (e.g., CG, DG), and/or a size of a packet/message (e.g., TB). For example, parameter(s) according to various embodiments of the present disclosure may be configured or determined differently or limitedly for at least one of a chain-based resource reservation operation of the TX UE, a block-based resource reservation operation of the TX UE, a blind retransmission operation of the TX UE, s SL HARQ feedback-based retransmission operation of the TX UE, a CG-based resource selection/reservation/determination operation of the TX UE, and/or a DG-based resource selection/reservation/determination operation of the TX UE.

For example, the following (some) rules (e.g., OPTION B) may be limitedly applied only to a service with a relatively lower reliability requirement (than a pre-configured threshold value). For example, the following (some) rules (e.g., OPTION B) may be limitedly applied only to a service with a relatively high error rate requirement. For example, the following (some) rules (e.g., OPTION B) may be limitedly applied only to a service with an error rate requirement. For example, the error rate may be a block error rate (BLER).

Based on an embodiment of the present disclosure, even if the number of retransmissions related to a specific TB of the MODE 1 TX UE reaches the MAX_RETXNUM, the MODE 1 TX UE may receive NACK information from the RX UE. For example, even if the number of retransmissions related to a specific SL HARQ process of the MODE 1 TX UE reaches the MAX_RETXNUM, the MODE 1 TX UE may receive NACK information from the RX UE. For example, even if the number of retransmissions related to a specific TB of the MODE 1 TX UE reaches the MAX_RETXNUM, the MODE 1 TX UE may not receive SL HARQ feedback information from the RX UE. For example, even if the number of retransmissions related to a specific SL HARQ process of the MODE 1 TX UE reaches the MAX_RETXNUM, the MODE 1 TX UE may not receive SL HARQ feedback information from the RX UE. For example, if the RX UE fails to decode/receive a PSCCH, or if the TX UE fails to receive/detect a PSFCH, the MODE 1 TX UE may not receive SL HARQ feedback information from the RX UE. For example, if the MODE 1 TX UE transmits a TB for which HARQ feedback is disabled to the RX UE, the MODE 1 TX UE may not receive SL HARQ feedback information from the RX UE.

For example, as described above, if the MODE 1 TX UE receives NACK information from the RX UE, or if the MODE 1 TX UE does not receive SL HARQ feedback information from the RX UE, the MODE 1 TX UE may be configured to report ACK information or pre-configured state/indicator information to the base station through a (pre-configured) PUCCH resource. For example, the MODE 1 TX UE may report the ACK information or the pre-configured state/indicator information to the base station through the (pre-configured) PUCCH resource.

For example, as described above, if the MODE 1 TX UE receives NACK information from the RX UE, or if the MODE 1 TX UE does not receive SL HARQ feedback information from the RX UE, the MODE 1 TX UE may be configured to report NACK information or DTX information to the base station through a (pre-configured) PUCCH resource. For example, the MODE 1 TX UE may report the NACK information or the DTX information to the base station through the (pre-configured) PUCCH resource.

Hereinafter, for convenience of description, the operation in which the MODE 1 TX UE reports ACK information, pre-configured state/indicator information, NACK information, or DTX information to the base station through the (pre-configured) PUCCH resource may be referred to as OPTION A.

Alternatively, for example, as described above, if the MODE 1 TX UE receives NACK information from the RX UE, or if the MODE 1 TX UE does not receive SL HARQ feedback information from the RX UE, the MODE 1 TX UE may be configured not to perform PUCCH transmission to the base station. For example, the MODE 1 TX UE may not perform PUCCH transmission to the base station. Hereinafter, for convenience of description, the operation in which the MODE 1 TX UE does not perform PUCCH transmission to the base station may be referred to as OPTION B.

Herein, for example, the OPTION A may be applied or configured only if SL HARQ feedback information reported by the MODE 1 TX UE to the base station through the (pre-configured) PUCCH resource is SL HARQ feedback information for a plurality of TBs. For example, the OPTION A may be applied or configured only if SL HARQ feedback information reported by the MODE 1 TX UE to the base station through the (pre-configured) PUCCH resource is SL HARQ feedback information for a plurality of SL HARQ processes. For example, the OPTION A may be applied or configured only if SL HARQ feedback information, reported by the MODE 1 TX UE to the base station through the (pre-configured) PUCCH resource, includes SL HARQ feedback information for a TB and/or a HARQ process in which the number of retransmissions has reached the MAX_RETXNUM and SL HARQ feedback information for a TB and/or a HARQ process in which the number of retransmissions has not reached the MAX_RETXNUM.

For example, based on the OPTION A, the base station may receive ACK information or pre-configured state/indicator information from the MODE 1 TX UE. For example, if the total number of retransmission-related resources allocated by the base station to the MODE 1 TX UE is greater than the MAX_RETXNUM, the base station may receive ACK information or pre-configured state/indicator information from the MODE 1 TX UE. Through this, retransmission resource(s) not to be actually used by the MODE 1 TX UE may be utilized for other purposes (e.g., UL communication) (by the base station). For example, the base station may allocate retransmission resource(s) not to be actually used by the MODE 1 TX UE as SL resource(s) of other UEs. For example, the base station may allocate retransmission resource(s) not to be actually used by the MODE 1 TX UE as UL resource(s) of other UEs. For example, the base station may allocate retransmission resource(s) not to be actually used by the MODE 1 TX UE as UL resource(s) of the MODE 1 TX UE.

Based on an embodiment of the present disclosure, if the MODE 1 TX UE reports SL HARQ feedback information to the base station through the (pre-configured) PUCCH resource, the MODE 1 TX UE may transmit identifier information of a SL HARQ process associated with (each) SL HARQ feedback information together with SL HARQ feedback information to the base station. For example, the SL HARQ feedback information may be SL HARQ feedback information received from the RX UE. For example, if the SL HARQ feedback information is not received from the RX UE, the SL HARQ feedback information reported to the base station through the PUCCH resource may be generated by the MODE 1 TX UE. For example, if the MODE 1 TX UE reports SL HARQ feedback information to the base station through the (pre-configured) PUCCH resource, the MODE 1 TX UE may transmit index information of a mode 1 CG associated with (each) SL HARQ feedback information together with SL HARQ feedback information to the base station. For example, if the MODE 1 TX UE reports SL HARQ feedback information to the base station through the (pre-configured) PUCCH resource, the MODE 1 TX UE may transmit TB information associated with (each) SL HARQ feedback information together with SL HARQ feedback information to the base station. For example, if the MODE 1 TX UE reports SL HARQ feedback information to the base station through the (pre-configured) PUCCH resource, the MODE 1 TX UE may transmit information on the number of retransmissions performed with respect to the SL HARQ process associated with (each) SL HARQ feedback information together with SL HARQ feedback information to the base station. For example, if the MODE 1 TX UE reports SL HARQ feedback information to the base station through the (pre-configured) PUCCH resource, the MODE 1 TX UE may transmit information on the number of retransmissions performed with respect to the TB associated with (each) SL HARQ feedback information together with SL HARQ feedback information to the base station. For example, if the MODE 1 TX UE reports SL HARQ feedback information to the base station through the (pre-configured) PUCCH resource, the MODE 1 TX UE may transmit information on the number of remaining retransmissions related to the SL HARQ process associated with (each) SL HARQ feedback information together with SL HARQ feedback information to the base station. For example, if the MODE 1 TX UE reports SL HARQ feedback information to the base station through the (pre-configured) PUCCH resource, the MODE 1 TX UE may transmit information on the number of remaining retransmissions related to the TB associated with (each) SL HARQ feedback information together with SL HARQ feedback information to the base station.

Figure 14:
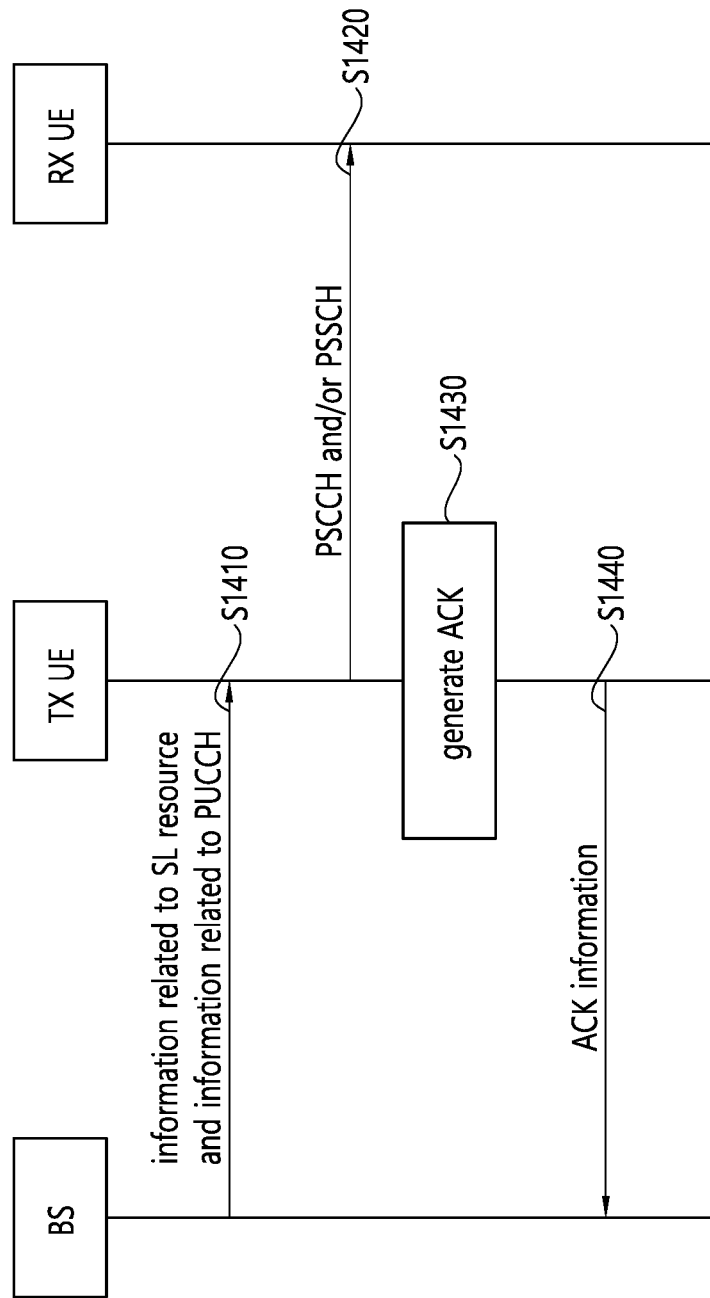
FIG. 14 shows a procedure for a TX UE to report HARQ feedback information to a base station, based on an embodiment of the present disclosure.

FIG. 14 shows a procedure for a TX UE to report HARQ feedback information to a base station, based on an embodiment of the present disclosure. The embodiment of FIG. 14 may be combined with various embodiments of the present disclosure.

Referring to FIG. 14, in step S1410, the TX UE may receive information related to a SL resource and/or information related to a PUCCH resource from the base station. For example, the SL resource may include a PSCCH resource and/or a PSSCH resource. For example, the PUCCH resource may be a resource related to the SL resource. For example, the PUCCH resource may be a resource used to report HARQ feedback to the base station.

Additionally, for example, the TX UE may receive information related to the maximum number of transmissions from the base station. For example, the maximum number of transmissions may include initial transmission and retransmission. For example, the maximum number of transmissions may be the maximum number of transmissions related to a specific TB. For example, the maximum number of transmissions may be the maximum number of transmissions related to a specific MAC PDU.

In step S1420, the TX UE may transmit a PSCCH and/or a PSSCH to the RX UE. For example, the TX UE may transmit the PSCCH and/or the PSSCH to the RX UE based on the SL resource. For example, the TX UE may transmit a medium access control (MAC) packet data unit (PDU) for which HARQ feedback is disabled to the RX UE based on the SL resource. The MAC PDU for which HARQ feedback is disabled may be transmitted through the PSSCH. For example, the TX UE may perform blind retransmission for the MAC PDU based on the SL resource. In this case, since HARQ feedback is disabled for the MAC PDU, HARQ feedback for the MAC PDU may not be transmitted by the RX UE. That is, in the case of the blind retransmitted MAC PDU, the RX UE may not transmit HARQ feedback for the MAC PDU.

In step S1430, if HARQ feedback is disabled for the MAC PDU and retransmission of the MAC PDU is not required, the TX UE may generate ACK information related to transmission of the MAC PDU. For example, if the number of transmissions for the MAC PDU reaches the maximum number of transmissions, retransmission of the MAC PDU may not be required for the TX UE. For example, if the number of transmissions for the MAC PDU reaches the maximum number of transmissions, the TX UE may not be allowed to retransmit the MAC PDU.

In step S1440, the TX UE may transmit the ACK information to the base station based on the PUCCH resource. For example, the base station may not allocate additional (re)transmission resource(s) to the TX UE based on the ACK information.

Based on an embodiment of the present disclosure, the MODE 1 TX UE does not successfully transmit a TB to the RX UE or fails to successfully complete a SL HARQ process by using (re)transmission resource(s) previously allocated/scheduled, the MODE 1 TX UE may request allocation/scheduling of additional retransmission resource (s) for the TB and/or the SL HARQ process from the base station. For this, the MODE 1 TX UE may report SL HARQ feedback information to the base station through a (pre-configured) PUCCH resource. For example, the SL HARQ feedback information may be SL HARQ feedback information received from the RX UE. For example, if the SL HARQ feedback information is not received from the RX UE, the SL HARQ feedback information reported to the base station through the PUCCH resource may be generated by the MODE 1 TX UE.

Figure 15:
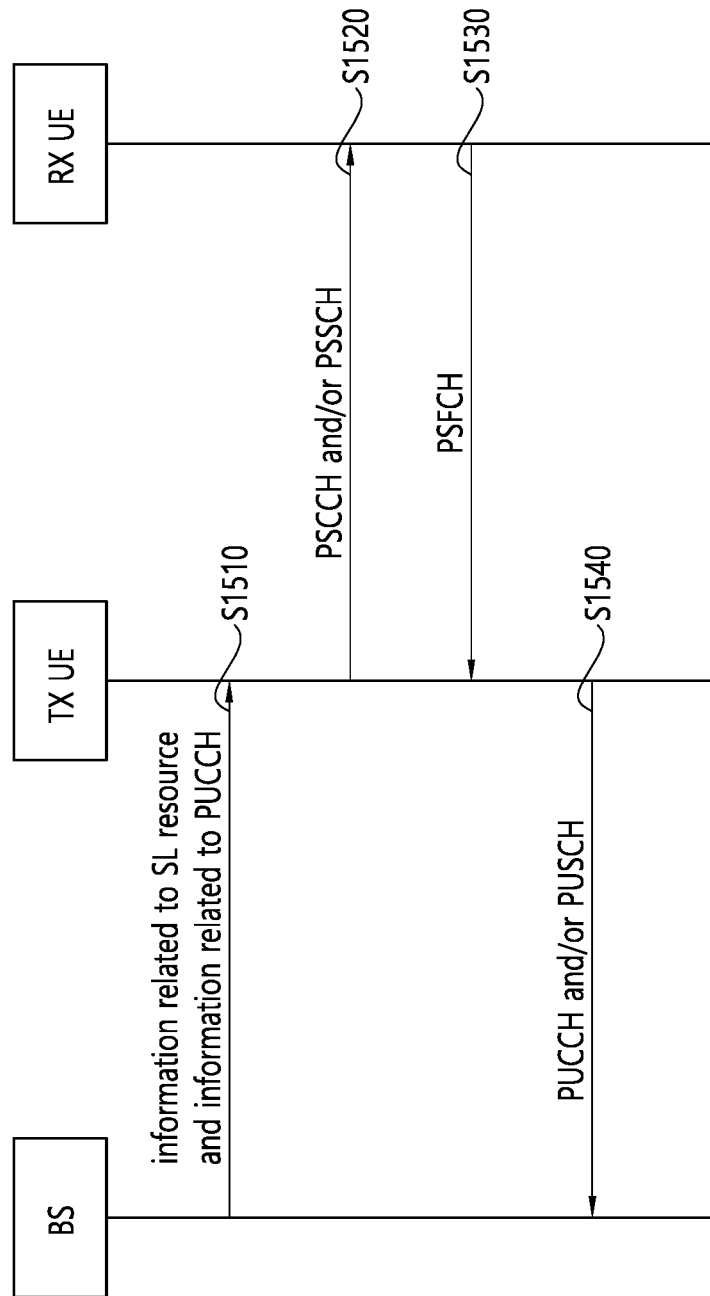
FIG. 15 shows a procedure for a TX UE to report HARQ feedback information to a base station, based on an embodiment of the present disclosure.

FIG. 15 shows a procedure for a TX UE to report HARQ feedback information to a base station, based on an embodiment of the present disclosure. The embodiment of FIG. 15 may be combined with various embodiments of the present disclosure.

Referring to FIG. 15, in step S1510, the TX UE may receive information related to a SL resource and/or information related to a PUCCH resource from the base station. In step S1520, the TX UE may transmit a PSCCH and/or a PSSCH to the RX UE.

In step S1530, the TX UE may receive a PSFCH related to the PSCCH and/or the PSSCH from the RX UE. Alternatively, for example, the RX UE may skip/omit transmission of the PSFCH. Alternatively, for example, the TX UE may skip/omit reception of the PSFCH.

In step S1540, the TX UE may transmit a PUCCH and/or a PUSCH to the base station. For example, the TX UE may report HARQ feedback information to the base station through the PUCCH and/or the PUSCH. For example, HARQ feedback information reported by the TX UE through the PUCCH and/or the PUSCH may be determined based on the CASE A to the CASE D. For example, whether or not the TX UE skips/omits PUCCH transmission and/or PUSCH transmission may be determined based on the CASE A to the CASE D. For convenience of description, the CASE A to the CASE D may be defined as below. Herein, for example, the PSCCH/PSSCH may be a PSCCH/PSSCH related to a (specific) TB. For example, the PSCCH/PSSCH may be a PSCCH/PSSCH related to a (specific) SL HARQ process. For example, a TB to be transmitted may be a TB to be transmitted by the TX UE in relation to a (specific) SL HARQ process.

1) CASE A

For example, in case the TX UE transmits a PSCCH/PSSCH to the RX UE, and the RX UE does not transmit a PSFCH (e.g., SL HARQ feedback information) to the TX UE due to the failure of decoding the PSCCH, and/or For example, in case the TX UE transmits a PSCCH/PSSCH to the RX UE, and the RX UE does not transmit a PSFCH related to the PSCCH/PSSCH to the TX UE based on a (pre-configured) priority-based dropping rule.

2) CASE B

For example, in case the TX UE transmits a PSCCH/PSSCH to the RX UE, and the RX UE which has received the PSCCH/PSSCH transmits a PSFCH (e.g., SL HARQ feedback information) related to the PSCCH/PSSCH to the TX UE, and the TX UE fails to receive the (corresponding) PSFCH, and/or For example, in case the TX UE transmits a PSCCH/PSSCH to the RX UE, and the RX UE which has successfully decoded the PSCCH/PSSCH transmits a PSFCH (e.g., SL HARQ feedback information) related to the PSCCH/PSSCH to the TX UE, and the TX UE fails to receive the (corresponding) PSFCH, and/or For example, in case the TX UE transmits a PSCCH/PSSCH to the RX UE, and the RX UE which has received the PSCCH/PSSCH transmits a PSFCH (e.g., SL HARQ feedback information) related to the PSCCH/PSSCH to the TX UE, and the TX UE does not receive the PSFCH related to the PSCCH/PSSCH based on a (pre-configured) priority-based dropping rule, and/or For example, in case the TX UE transmits a PSCCH/PSSCH to the RX UE, and the RX UE which has successfully decoded the PSCCH/PSSCH transmits a PSFCH (e.g., SL HARQ feedback information) related to the PSCCH/PSSCH to the TX UE, and the TX UE does not receive the PSFCH related to the PSCCH/PSSCH based on a (pre-configured) priority-based dropping rule

3) CASE C

For example, in case the TX UE does not transmit a PSCCH/PSSCH to the RX UE because a TB to be transmitted by the TX UE to the RX UE does not exist in a buffer of the TX UE

4) CASE D

For example, in case a TB to be transmitted by the TX UE to the RX UE is in a buffer of the TX UE, and the TX UE does not transmit a PSCCH/PSSCH based on a (pre-configured) priority-based dropping rule, and/or For example, in case a TB to be transmitted by the TX UE to the RX UE is in a buffer of the TX UE, and the TX UE does not transmit a PSCCH/PSSCH based on congestion control-based physical layer parameter restriction (e.g., (maximum) CR value restriction)

For example, if a TB to be transmitted by the TX UE to the RX UE is (still) exist in a buffer of the TX UE, the TX UE may transmit NACK information to the base station through a PUCCH to request additional retransmission resource allocation/scheduling from the base station. For example, if a TB to be transmitted by the TX UE to the RX UE is (still) exist in a buffer of the TX UE, the TX UE may transmit DTX information to the base station through a PUCCH to request additional retransmission resource allocation/scheduling from the base station. For example, if a TB to be transmitted by the TX UE to the RX UE is (still) exist in a buffer of the TX UE, the TX UE may transmit pre-configured state/indicator information to the base station through a PUCCH to request additional retransmission resource allocation/scheduling from the base station. For example, the case in which the TB to be transmitted by the TX UE to the RX UE is (still) exist in the buffer of the TX UE may be at least one of the CASE A, the CASE B and/or the CASE D.

For example, if the TX UE does not (actually) transmit a TB to the RX UE, the TX UE may transmit NACK information to the base station through a PUCCH to request additional retransmission resource allocation/scheduling from the base station. For example, if the TX UE does not (actually) transmit a TB to the RX UE, the TX UE may transmit DTX information to the base station through a PUCCH to request additional retransmission resource allocation/scheduling from the base station. For example, if the TX UE does not (actually) transmit a TB to the RX UE, the TX UE may transmit pre-configured state/indicator information to the base station through a PUCCH to request additional retransmission resource allocation/scheduling from the base station. For example, the case in which the TX UE does not (actually) transmit the TB to the RX UE may be the CASE D.

For example, if a TB to be transmitted by the TX UE to the RX UE does not exist in a buffer of the TX UE, the TX UE may transmit ACK information to the base station through a PUCCH. For example, if a TB to be transmitted by the TX UE to the RX UE does not exist in a buffer of the TX UE, the TX UE may not transmit a PUCCH to the base station. In this case, the base station may not perform additional retransmission resource allocation/scheduling for the TX UE. For example, the case in which the TB to be transmitted by the TX UE to the RX UE does not exist in the buffer of the TX UE may be the CASE C.

For example, if the TX UE receives ACK information for the PSCCH/PSSCH transmitted by the TX UE from the RX UE, the TX UE may transmit ACK information to the base station through a PUCCH. For example, if the TX UE receives ACK information for the PSCCH/PSSCH transmitted by the TX UE from the RX UE, the TX UE may not transmit a PUCCH to the base station. In this case, the base station may not perform additional retransmission resource allocation/scheduling for the TX UE.

Based on an embodiment of the present disclosure, if at least one of the first to third conditions is satisfied, the MODE 1 TX UE may designate/set a (pre-defined) SL HARQ feedback request field included in a SCI to "disabled". For example, the SCI may be a first SCI transmitted through a PSCCH. For example, the SCI may be a second SCI transmitted through a PSSCH. For example, if a SL HARQ feedback operation is enabled (in advance) for a resource pool, and if at least one of the first to third conditions is satisfied, the MODE 1 TX UE may designate/set the (pre-defined) SL HARQ feedback request field included in the SCI to "disabled". For example, if the SL HARQ feedback operation is enabled (in advance) between the TX UE and the RX UE for the resource pool, and if at least one of the first to third conditions is satisfied, the MODE 1 TX UE may designate/set the (pre-defined) SL HARQ feedback request field included in the SCI to "disabled". For example, if the SL HARQ feedback operation is enabled for a specific MAC PDU, and if at least one of the first to third conditions is satisfied, the MODE 1 TX UE may designate/set the (pre-defined) SL HARQ feedback request field included in the SCI related to the MAC PDU to "disabled". For example, the network may configure or pre-configure the first to third conditions to the UE. For example, the network may be a base station or an RSU.

For example, if at least one of the first to third conditions is satisfied, the MODE 1 TX UE which transmits a PSCCH/PSSCH may instruct or inform the RX UE not to transmit SL HARQ feedback for the PSCCH/PSSCH. For example, based on whether or not pre-configured condition(s) is satisfied, the TX UE may (independently) change (dynamically) a value of the SL HARQ feedback request field related to PSCCH/PSSCH transmission.

1) First condition: if a (resource pool-related) congestion level measured by the TX UE is higher than a pre-configured first threshold, or if the (resource pool-related) congestion level measured by the TX UE is lower than a pre-configured second threshold, and/or 2) Second condition: if the number of PSFCH resources necessary for and/or required for PSCCH/PSSCH transmission of the TX UE is less than a pre-configured threshold (in a resource pool), and/or 3) Third condition: if the TX UE transmits SL information having a priority lower than a pre-configured priority (i.e., a large priority value), or if the TX UE transmits SL information having a requirement lower than a pre-configured criterion (e.g., low reliability, high latency)

Meanwhile, if the rule and/or the operation described above is applied, for example, when the TX UE transmits a PSCCH/PSSCH to the RX UE, it may be difficult for the base station to determine (accurately) a state/value of a (pre-defined) SL HARQ feedback request field included in a SCI indicated by the TX UE. In consideration of this, for example, if the TX UE transmits the PSCCH/PSSCH to the RX UE by designating/setting the SL HARQ feedback request field to "disabled", the TX UE may report ACK information to the base station through a PUCCH. For example, if the TX UE transmits the PSCCH/PSSCH to the RX UE by designating/setting the SL HARQ feedback request field to "disabled", the TX UE may not perform PUCCH transmission. For example, if the TX UE transmits the PSCCH/PSSCH to the RX UE by designating/setting the SL HARQ feedback request field to "disabled", the TX UE may report NACK information to the base station through a PUCCH. For example, if the TX UE transmits the PSCCH/PSSCH to the RX UE by designating/setting the SL HARQ feedback request field to "disabled", the TX UE may report pre-configured state/indicator information to the base station through a PUCCH.

Based on an embodiment of the present disclosure, in the case of a pre-configured specific cast type (e.g., groupcast), a SL HARQ feedback transmission operation (of the RX UE) based on a distance between the TX UE and the RX UE may be configured. For convenience of description, the SL HARQ feedback operation based on the distance between the TX UE and the RX UE may be referred to as a distance-based HARQ feedback operation. For example, in the distance-based HARQ feedback operation, if the distance between the TX UE and the RX UE is less than or equal to a communication range requirement, (i) the RX UE which has failed to decode a PSSCH may transmit NACK information to the TX UE, and (ii) the RX UE which has succeeded in decoding a PSSCH may not transmit ACK information to the TX UE. That is, the RX UE may perform NACK only feedback. On the other hand, for example, in the distance-based HARQ feedback operation, if the distance between the TX UE and the RX UE is greater than a communication range requirement, the RX UE may not transmit HARQ feedback information to the TX UE. That is, the RX UE may not perform HARQ feedback.

For example, if the distance-based HARQ feedback operation is configured/applied, the TX UE may transmit/signal location information (e.g., zone ID) of the TX UE to the RX UE through a pre-defined field (hereinafter, TXLO_FLD) included in a SCI (e.g., $2^{nd}$ SCI) transmitted by the TX UE. In this case, for example, only if the RX UE fails to decode/receive a PSSCH, the RX UE may be configured to transmit NACK information to the TX UE. For convenience of description, this may be referred to as OPTION 1.

On the other hand, for example, an operation in which the RX UE transmits ACK information if the RX UE succeeds in decoding/receiving a PSSCH but the RX UE transmits NACK information if the RX UE fails to decode/receive a PSSCH may be configured/applied. For convenience of description, this may be referred to as OPTION 2. For example, if the OPTION 2 is configured/applied, the TX UE may not transmit the above-described location information (e.g., zone ID) of the TX UE through TXLO_FLD included in the SCI (e.g., $2^{nd}$ SCI). That is, if the OPTION 2 is configured/applied, the TX UE does not need to transmit the above-described location information (e.g., zone ID) of the TX UE through TXLO_FLD included in the SCI (e.g., $2^{nd}$ SCI). For example, if the distance-based HARQ feedback operation is not configured, the TX UE may not transmit the above-described location information (e.g., zone ID) of the TX UE through TXLO_FLD included in the SCI (e.g., 2nd SCI). That is, if the distance-based HARQ feedback operation is not configured, the TX UE does not need to transmit the above-described location information (e.g., zone ID) of the TX UE through TXLO_FLD included in the SCI (e.g., $2^{nd}$ SCI).

Herein, for example, in order to reduce the (implementation) complexity required for the RX UE to decode the large number of SCIs (e.g., $2^{nd}$ SCI, $1^{st}$ SCI) having different payload sizes, if the OPTION 2 is configured/applied, the TX UE may pad TXLO_FLD with a pre-configured bit value (e.g., 0). For example, in order to reduce the (implementation) complexity required for the RX UE to decode the large number of SCIs (e.g., $2^{nd}$ SCI, $1^{st}$ SCI) having different payload sizes, if the OPTION 2 is configured/applied, the TX UE may repeatedly transmit (some) bits related to a specific field included in a pre-configured SCI (e.g., $2^{nd}$ SCI) (through TXLO_FLD). In this case, for example, the payload size of the SCI (e.g., $2^{nd}$ SCI) may be the same between the OPTION 1 and the OPTION 2. For example, the payload size of the SCI (e.g., $2^{nd}$ SCI) may be the same between a case for which the SL HARQ feedback transmission operation according to the distance between the TX UE and the RX UE (i.e., distance-based HARQ feedback operation) is enabled and a case for which the distance-based HARQ feedback operation is disabled.

For example, the TX UE may be configured to omit TXLO_FLD. For example, the payload sizes of the SCIs (e.g., $2^{nd}$ SCI) may be different between the OPTION 1 and the OPTION 2. For example, the payload sizes of the SCIs (e.g., $2^{nd}$ SCI) may be different between a case for which the SL HARQ feedback transmission operation according to the distance between the TX UE and the RX UE (i.e., distance-based HARQ feedback operation) is enabled and a case for which the distance-based HARQ feedback operation is disabled.

For example, SCI formats may be defined differently based on the OPTION 1 and the OPTION 2. For example, SCI formats may be defined differently based on whether the SL HARQ feedback transmission operation according to the distance between the TX UE and the RX UE is enabled or disabled.

Figure 16:
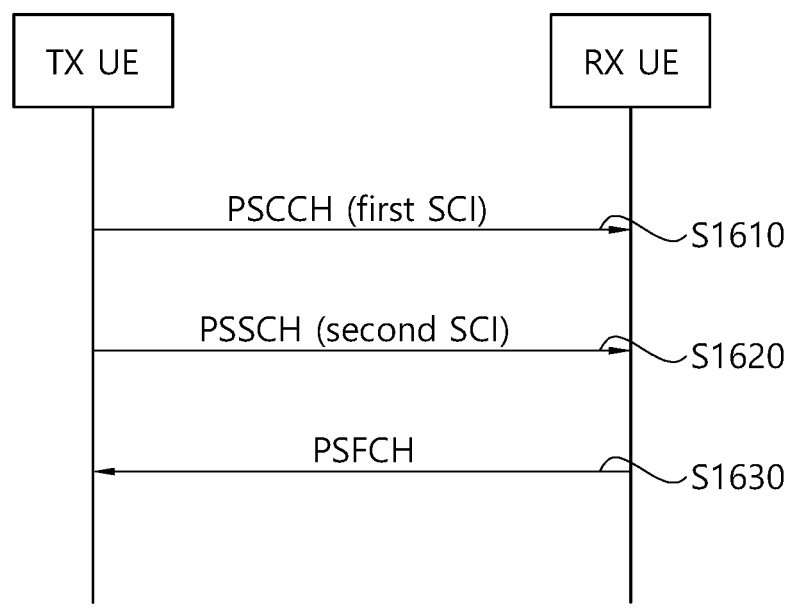
FIG. 16 shows a procedure for a RX UE to perform a HARQ feedback operation based on a different SCI format, based on an embodiment of the present disclosure.

FIG. 16 shows a procedure for a RX UE to perform a HARQ feedback operation based on a different SCI format, based on an embodiment of the present disclosure. The embodiment of FIG. 16 may be combined with various embodiments of the present disclosure.

Referring to FIG. 16, in step S1610, the TX UE may transmit a first SCI to the RX UE through a PSCCH.

In step S1620, the TX UE may transmit a second SCI to the RX UE through a PSSCH. Additionally, the TX UE may transmit a MAC PDU to the RX UE through the PSSCH. For example, the MAC PDU may be a MAC PDU for which HARQ feedback is enabled. For example, a format of the second SCI may be (i) SCI format 2-A not including location information of the TX UE or (ii) SCI format 2-B including location information of the TX UE.

For example, the SCI format 2-A may be defined as below.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:
HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 6
CSI request—1 bit

TABLE 6

| Value of Cast type indicator | Cast type |
| --- | --- |
| 00 | Broadcast |
| 01 | Groupcast when HARQ-ACK information includes ACK or NACK |
| 10 | Unicast |
| 11 | Groupcast when HARQ-ACK information includes only NACK |

For example, the SCI format 2-B may be defined as below.

SCI format 2-B is used for the decoding of PSSCH, with HARQ operation when HARQ-ACK information includes only NACK, or when there is no feedback of HARQ-ACK information.

The following information is transmitted by means of the SCI format 2-B:
HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits In step S1630, the RX UE may determine whether to transmit a PSFCH to the TX UE. For example, the RX UE may determine whether to perform the distance-based HARQ feedback operation based on the format of the second SCI. For example, if the format of the second SCI is the SCI format 2-A which does not include the location information of the TX UE, the RX UE may not perform the distance-based HARQ feedback operation. In this case, for example, the distance-based HARQ feedback operation may be disabled. For example, if the format of the second SCI is the SCI format 2-B which includes the location information of the TX UE, the RX UE may perform the distance-based HARQ feedback operation. In this case, for example, the distance-based HARQ feedback operation may be enabled.

Based on an embodiment of the present disclosure, in order to reduce a resource collision probability (between different UEs) for TB-related initial transmission, the TX UE may transmit a pre-reservation signal (e.g., including a PSCCH and/or a PSSCH) (before initial transmission). For example, the pre-reservation signal may include information related to initial transmission and/or information related to retransmission following the pre-reservation signal. For example, the information related to initial transmission and/or the information related to retransmission following the pre-reservation signal may include location information and/or priority information related to resource(s) reserved/selected by the TX UE. For example, the resource may include a time resource and/or a frequency resource. For example, the priority information may be priority information of a packet/message associated with resource(s) reserved/selected by the TX UE.

For example, the TX UE may be configured to pad pre-configured bits (e.g., 0) and/or following TB-related (some) bits on the remaining RE(s) except for the $2^{nd}$ SCI in PSSCH resources related to the (corresponding) pre-reservation (hereinafter referred to as ALT 1). For example, the TX UE may pad pre-configured bits (e.g., 0) and/or following TB-related (some) bits on the remaining RE(s) except for the $2^{nd}$ SCI in PSSCH resources related to the (corresponding) pre-reservation, and may transmit it to the RX UE.

For example, the TX UE may be configured to transmit (repeatedly) the $2^{nd}$ SCI (by rate-matching) on the remaining RE(s) except for the $2^{nd}$ SCI in PSSCH resources related to the (corresponding) pre-reservation (hereinafter referred to as ALT 2). For example, the TX UE may transmit (repeatedly) the $2^{nd}$ SCI (by rate-matching) to the TX UE on the remaining RE(s) except for the $2^{nd}$ SCI in PSSCH resources related to the (corresponding) pre-reservation.

Herein, for example, in this case, the transmission of the pre-reservation signal may be counted as the pre-configured maximum number of retransmissions related to the TB. For example, in particular in the case of ALT 2, the transmission of the pre-reservation signal may be counted as the pre-configured maximum number of retransmissions related to the TB. Alternatively, the transmission of the pre-reservation signal may not be counted as the pre-configured maximum number of retransmissions related to the TB. For example, the maximum number of retransmissions related to the TB may be configured differently or independently for the TX UE for each resource pool. For example, the maximum number of retransmissions related to the TB may be configured differently or independently for the TX UE for each congestion level. For example, the maximum number of retransmissions related to the TB may be configured differently or independently for the TX UE for each service type. For example, the maximum number of retransmissions related to the TB may be configured differently or independently for the TX UE for each service priority. For example, the maximum number of retransmissions may be the maximum number of transmissions including initial transmission and retransmission. For example, the maximum number of retransmissions may be the maximum number of transmissions including only retransmissions, excluding initial transmissions.

For example, whether or not the TX UE can transmit/use the pre-reservation signal may be configured differently based on whether or not the size of a packet/message to be transmitted by the TX UE exceeds a pre-configured threshold. For example, if the TX UE transmits a TB having a size greater than a threshold, transmission/use of the pre-reservation signal may be (limitedly) enabled for the TX UE. For example, if the TX UE transmits a TB having a size greater than a threshold, the TX UE may transmit the pre-reservation signal to the RX UE. For example, if the TX UE transmits a TB having a size less than or equal to a threshold, transmission/use of the pre-reservation signal may be (limitedly) disabled for the TX UE. For example, if the TX UE transmits a TB having a size less than or equal to a threshold, the TX UE may not be allowed to transmit the pre-reservation signal.

For example, whether or not the TX UE can transmit/use the pre-reservation signal may be configured differently based on whether or not the size of a resource for the TX UE to transmit a packet/message exceeds a pre-configured threshold, compared with the size of a resource for the TX UE to transmit the pre-reservation signal. For example, the number of subchannels for the TX UE to transmit the pre-reservation signal may be pre-configured. For example, in order for the TX UE to transmit the pre-reservation signal, one subchannel may be pre-configured. For example, compared with the size of a resource for the TX UE to transmit the pre-reservation signal, if the size of a resource for the TX UE to transmit a packet/message is greater than a pre-configured threshold, transmission/use of the pre-reservation signal may be (limitedly) enabled for the TX UE. For example, compared with the size of a resource for the TX UE to transmit the pre-reservation signal, if the size of a resource for the TX UE to transmit a packet/message is less than or equal to a pre-configured threshold, transmission/use of the pre-reservation signal may be (limitedly) disabled for the TX UE.

For example, whether or not the TX UE can transmit/use the pre-reservation signal may be configured differently based on the size of a subchannel. For example, the size of the subchannel may be the size of one subchannel related to a resource pool. For example, if a subchannel having the number of RBs greater than a pre-configured threshold is configured for the TX UE, transmission/use of the pre-reservation signal may be (limitedly) enabled for the TX UE. For example, if a subchannel having the number of RBs equal to or less than a pre-configured threshold is configured for the TX UE, transmission/use of the pre-reservation signal may be (limitedly) disabled for the TX UE.

For example, whether or not the TX UE can transmit/use the pre-reservation signal may be configured differently based on whether or not the number of subchannels related to initial transmission (and/or retransmission) following the pre-reservation signal exceeds a pre-configured threshold. For example, if the number of subchannels related to initial transmission (and/or retransmission) following the pre-reservation signal exceeds a pre-configured threshold, transmission/use of the pre-reservation signal may be (limitedly) enabled for the TX UE. For example, if the number of subchannels related to initial transmission (and/or retransmission) following the pre-reservation signal is less than or equal to a pre-configured threshold, transmission/use of the pre-reservation may be (limitedly) disabled for the TX UE.

For example, whether or not the TX UE can transmit/use the pre-reservation signal may be configured differently based on at least one of a SL HARQ feedback option (e.g., the OPTION 1, the OPTION 2, the blind retransmission scheme, the HARQ feedback-based retransmission scheme) (described above), a cast type, a service type, a service priority, a resource pool, a congestion level (e.g., CBR), and/or a QoS requirement (e.g., reliability, latency).

For example, whether or not the TX UE can transmit/use the pre-reservation signal may be configured differently based on whether or not the size of a packet/message to be transmitted by the TX UE exceeds a pre-configured threshold. For example, if the TX UE transmits a TB having a size greater than a threshold, transmission/use of the pre-reservation signal may be (limitedly) disabled for the TX UE. For example, if the TX UE transmits a TB having a size less than or equal to a threshold, transmission/use of the pre-reservation signal may be (limitedly) enabled for the TX UE.

For example, whether or not the TX UE can transmit/use the pre-reservation signal may be configured differently based on whether or not the size of a resource for the TX UE to transmit a packet/message exceeds a pre-configured threshold, compared with the size of a resource for the TX UE to transmit the pre-reservation signal. For example, the number of subchannels for the TX UE to transmit the pre-reservation signal may be pre-configured. For example, in order for the TX UE to transmit the pre-reservation signal, one subchannel may be pre-configured. For example, compared with the size of a resource for the TX UE to transmit the pre-reservation signal, if the size of a resource for the TX UE to transmit a packet/message is greater than a pre-configured threshold, transmission/use of the pre-reservation signal may be (limitedly) disabled for the TX UE. For example, compared with the size of a resource for the TX UE to transmit the pre-reservation signal, if the size of a resource for the TX UE to transmit a packet/message is less than or equal to a pre-configured threshold, transmission/use of the pre-reservation signal may be (limitedly) enabled for the TX UE.

For example, whether or not the TX UE can transmit/use the pre-reservation signal may be configured differently based on the size of a subchannel. For example, the size of the subchannel may be the size of one subchannel related to a resource pool. For example, if a subchannel having the number of RBs greater than a pre-configured threshold is configured for the TX UE, transmission/use of the pre-reservation signal may be (limitedly) disabled for the TX UE. For example, if a subchannel having the number of RBs equal to or less than a pre-configured threshold is configured for the TX UE, transmission/use of the pre-reservation signal may be (limitedly) enabled for the TX UE.

For example, whether or not the TX UE can transmit/use the pre-reservation signal may be configured differently based on whether or not the number of subchannels related to initial transmission (and/or retransmission) following the pre-reservation signal exceeds a pre-configured threshold. For example, if the number of subchannels related to initial transmission (and/or retransmission) following the pre-reservation signal exceeds a pre-configured threshold, transmission/use of the pre-reservation signal may be (limitedly) disabled for the TX UE. For example, if the number of subchannels related to initial transmission (and/or retransmission) following the pre-reservation signal is less than or equal to a pre-configured threshold, transmission/use of the pre-reservation may be (limitedly) enabled for the TX UE.

Based on an embodiment of the present disclosure, the number of (maximum or minimum) resources that can be signaled by (resource) reservation/selection information included in one SCI (hereinafter, N_MAX) may be configured differently based on whether or not the size of a packet/message exceeds a pre-configured threshold. For example, in the case of a packet/message having a size greater than a threshold, the N_MAX value may be configured to a relatively large value (compared to the case otherwise).

For example, the N_MAX included in one SCI may be configured differently based on a SL HARQ feedback option. For example, the SL HARQ feedback option may include the OPTION 1, the OPTION 2, the blind retransmission scheme, the HARQ feedback-based retransmission scheme, (described above) etc. For example, in the case of the blind retransmission scheme, the N_MAX value may be configured to a relatively large value (compared to other cases).

For example, the N_MAX included in one SCI may be configured differently based on a cast type. For example, the N_MAX included in one SCI may be configured differently based on a service type. For example, the N_MAX included in one SCI may be configured differently based on a service priority. For example, the N_MAX included in one SCI may be configured differently based on a resource pool. For example, the N_MAX included in one SCI may be configured differently based on a congestion level (e.g., CBR). For example, the N_MAX included in one SCI may be configured differently based on a QoS requirement (e.g., reliability, latency). For example, the N_MAX included in one SCI may be configured differently based on the size of a subchannel. For example, the size of the subchannel may be the size of one subchannel related to the resource pool.

Based on an embodiment of the present disclosure, the TX UE may transmit the pre-reservation signal by using a frequency resource of a specific size. For example, the pre-reservation signal may be transmitted to one or more RX UEs. For example, the pre-reservation signal may be transmitted in the form of PSCCH and PSSCH. For example, the pre-reservation signal may be transmitted in the form of PSCCH and/or PSSCH. For example, the pre-reservation signal may be transmitted in the form shown in FIG. 17.

Figure 17:
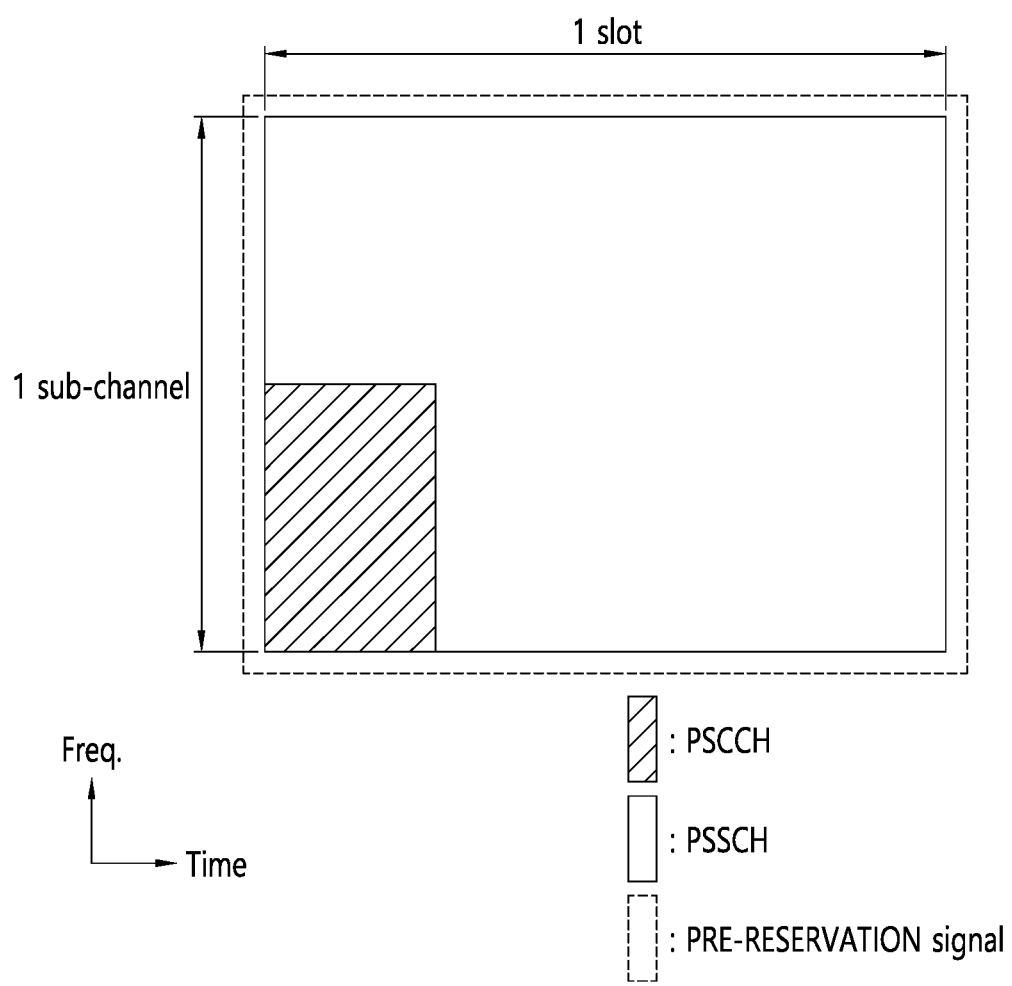
FIG. 17 shows a pre-reservation signal based on an embodiment of the present disclosure.

FIG. 17 shows a pre-reservation signal based on an embodiment of the present disclosure. The embodiment of FIG. 17 may be combined with various embodiments of the present disclosure.

Referring to FIG. 17, the TX UE may transmit a pre-reservation signal by using one slot and one subchannel.

For example, transmitting the pre-reservation signal by the TX UE may include transmitting dummy information by the TX UE on the remaining resources except for resources on which the $2^{nd}$ SCI is transmitted among PSSCH resources. For example, the TX UE may rate-match dummy information of a pre-configured (bit) value on the remaining resources except for the resources on which the $2^{nd}$ SCI is transmitted among the PSSCH resources, and may transmit it. For example, the frequency resource of the specific size may be a single sub-channel. For example, the frequency resource and/or the size of the frequency resource through which the pre-reservation signal is transmitted may be pre-configured for the TX UE. For example, the base station may transmit, to the TX UE, information related to the frequency resource through which the pre-reservation signal is transmitted and/or information related to the size of the frequency resource through which the pre-reservation signal is transmitted.

For example, if the TX UE transmits the pre-reservation signal on the frequency resource of the specific size, the TX UE may transmit/signal information related to a time gap between the location/time of a subsequent initial transmission-related reservation resource and the location/time of a resource related to a PSCCH, through the PSCCH (e.g., $1^{st}$ SCI). For example, the subsequent initial transmission-related reservation resource may be an initial transmission-related reservation resource for the TX UE to perform (actual) transmission. For example, if the TX UE transmits the pre-reservation signal on the frequency resource of the specific size, the TX UE may transmit/signal information related to a time gap between the location/time of a subsequent initial transmission and/or retransmission-related reservation resource and the location/time of a resource related to a PSCCH, through the PSCCH (e.g., $1^{st}$ SCI). For example, the initial transmission-related reservation resource and/or the retransmission-related reservation resource may be resource(s) for actual TB transmission. Herein, for example, based on a value of information related to the (corresponding) time gap included in the PSCCH (e.g., $1^{st}$ SCI) transmitted by the TX UE, the RX UE may distinguish or determine whether the single subchannel transmission (described above) is transmission related to the pre-reservation signal or transmission related to general TB transmission. For example, if the TX UE transmits a PSCCH and/or a PSSCH to the RX UE, the RX UE may distinguish or determine whether transmission of the PSCCH and/or the PSSCH is transmission related to the pre-reservation signal or transmission related to general TB transmission, based on information related to the time gap included in the PSCCH (e.g., $1^{st}$ SCI).

For example, if the TX UE sets the time gap to a pre-configured specific value and transmits it to the RX UE, the RX UE may consider or determine PSCCH and/or PSSCH transmission by the TX UE as general TB transmission. For example, if the TX UE sets the time gap to zero and transmits it to the RX UE, the RX UE may consider or determine PSCCH and/or PSSCH transmission by the TX UE as general TB transmission.

For example, if the TX UE sets the time gap to a value other than the pre-configured specific value and transmits it to the RX UE, the RX UE may consider or determine PSCCH and/or PSSCH transmission by the TX UE as transmission of the pre-reservation signal. For example, if the TX UE sets the time gap to a value other than zero and transmits it to the RX UE, the RX UE may consider or determine PSCCH and/or PSSCH transmission by the TX UE as transmission of the pre-reservation signal.

Herein, for example, based on the above-described embodiment, the number of resources related to transmission of the pre-reservation signal may be excluded from the maximum number of transmission resources that the TX UE can signal/reserve through a SCI. For example, if the TX UE transmits dummy information (of a pre-configured bit value) (by rate-matching) on the remaining resources except for resources on which the $2^{nd}$ SCI is transmitted among PSSCH resources related to transmission of the pre-reservation signal, the number of resources related to transmission of the pre-reservation signal may be excluded from the maximum number of transmission resources that the TX UE can signal/reserve through the SCI. For example, the transmission resource may include a resource related to initial transmission and/or resource(s) related to retransmission. For example, the number of transmission resources that the TX UE can signal/reserve through the SCI may include only the number of resources that the TX UE uses for actual TB transmission.

For example, if transmission of the pre-reservation signal is configured for the TX UE, the TX UE may transmit information related to a time gap through a PSCCH related to transmission of the pre-reservation signal. For example, if transmission of the pre-reservation signal is not configured for the TX UE, information/field related to a time gap may not exist in a PSCCH (e.g., $1^{st}$ SCI) transmitted by the TX UE. For example, if transmission of the pre-reservation signal is configured specifically for a resource pool for the TX UE, the TX UE may transmit information related to a time gap through a PSCCH related to transmission of the pre-reservation signal on a specific resource pool. For example, if transmission of the pre-reservation signal is configured specifically for a service type for the TX UE, the TX UE desiring to transmit a specific type of a service may transmit information related to a time gap through a PSCCH related to transmission of the pre-reservation signal. For example, if the transmission of the pre-reservation signal is configured specifically for a service priority for the TX UE, the TX UE desiring to transmit a service of a specific priority may transmit information related to a time gap through a PSCCH related to transmission of the pre-reservation signal. For example, if transmission of the pre-reservation signal is configured specifically for a QoS requirement for the TX UE, the TX UE desiring to transmit a service having a specific QoS requirement may transmit information related to a time gap through a PSCCH related to transmission of the pre-reservation signal.

For example, due to a processing time necessary/required for the RX UE to decode the pre-reservation signal (hereinafter, PRC_TIME), the RX UE may not (actually) use some values among (candidate) values indicatable by information related to a time gap transmitted through a PSCCH related to transmission of the pre-reservation signal. For example, the RX UE may not use a time gap value smaller than the PRC_TIME. For example, the RX UE may not use a time gap value smaller than the PRC_TIME other than zero. Taking this into account, for example, the size of information related to the time gap may be reduced. For example, the size of the field related to the time gap may be reduced.

For example, the TX UE may select or determine a resource related to transmission of the pre-reservation signal and a resource related to subsequent initial transmission in consideration of the PRC_TIME (described above). For example, the resource related to the subsequent initial transmission may be a resource related to initial transmission for the TX UE to transmit a (actual) TB. For example, the TX UE may select or determine a resource related to transmission of the pre-reservation signal, a resource related to subsequent initial transmission, and a resource related to subsequent retransmission in consideration of the PRC_TIME (described above). For example, the resource related to the subsequent retransmission may be a resource related to retransmission for the TX UE to transmit a (actual) TB.

For example, the TX UE may preferentially select or determine a resource related to initial transmission and/or a resource related to retransmission (within a selection window) based on sensing, and the TX UE may select or determine a resource related to transmission of the pre-reservation signal from among selectable candidate resources before the PRC_TIME from the selected resource related to the initial transmission. For example, the resource related to the initial transmission may be a resource related to initial transmission for the TX UE to transmit a (actual) TB. For example, the TX UE may preferentially select or determine a resource related to initial transmission and/or a resource related to retransmission (within a selection window) based on sensing, and the TX UE may select or determine a resource related to transmission of the pre-reservation signal from among selectable candidate resources before a pre-configured value from the selected resource related to the initial transmission. For example, the pre-configured value may be a value greater than the PRC_TIME. For example, the pre-configured value may be a value less than the PRC_TIME.

For example, the TX UE may preferentially select or determine a resource related to initial transmission and/or a resource related to retransmission (within a selection window) based on sensing, and the TX UE may select or determine a resource related to transmission of the pre-reservation signal from among (selectable) candidate resources on the (remaining) selection window before the PRC_TIME from the selected resource related to the initial transmission. For example, the resource related to the initial transmission may be a resource related to initial transmission for the TX UE to transmit a (actual) TB. For example, the TX UE may preferentially select or determine a resource related to initial transmission and/or a resource related to retransmission (within a selection window) based on sensing, and the TX UE may select or determine a resource related to transmission of the pre-reservation signal from among (selectable) candidate resources on the (remaining) selection window before a pre-configured value from the selected resource related to the initial transmission. For example, the pre-configured value may be a value greater than the PRC_TIME. For example, the pre-configured value may be a value less than the PRC_TIME.

For example, the selection window size used by the TX UE to select or determine a resource related to transmission of the pre-reservation signal may be configured (independently) for the TX UE. For example, the maximum selection window size used by the TX UE to select or determine a resource related to transmission of the pre-reservation signal may be configured (independently) for the TX UE. For example, the minimum selection window size used by the TX UE to select or determine a resource related to transmission of the pre-reservation signal may be configured (independently) for the TX UE. Herein, for example, the TX UE may select a resource related to transmission of the pre-reservation signal within the selection window determined according to the above-described embodiment. For example, if a resource related to transmission of the pre-reservation signal does not exist within the selection window, the TX UE may not transmit the pre-reservation signal. For example, if a resource related to transmission of the pre-reservation signal does not exist within the selection window, transmission of the pre-reservation signal may be disabled for the TX UE. For example, although the TX UE performs a PSSCH DMRS RSRP threshold increase operation based on a pre-configured offset value by the maximum allowed number, if the TX UE cannot secure/select a resource related to transmission of the pre-reservation signal within the selection window, the TX UE may not transmit the pre-reservation signal. For example, the maximum allowed number may be pre-configured for the TX UE. For example, the pre-configured offset value may be 3 [dB].

FIG. 18 shows a method for a first device to report SL HARQ feedback information to a base station, based on an embodiment of the present disclosure. The embodiment of FIG. 18 may be combined with various embodiments of the present disclosure.

Referring to FIG. 18, in step S1810, the first device may transmit SL HARQ feedback information to the base station through a first resource. For example, the first resource may be a PUCCH resource. For example, if the number of retransmissions related to first sidelink information performed by the first device reaches the MAX_RETXNUM, and if the first device determines that the first sidelink information is not successfully transmitted, the first device may report ACK information or pre-configured state/indicator information to the base station through the first resource. For example, based on various embodiments of the present disclosure, the first device may transmit SL HARQ feedback information to the base station through the first resource. For example, if the first device transmits SL HARQ feedback information to the base station through the first resource, at least one of identifier information of a SL HARQ process associated with the SL HARQ feedback information, an index of a mode 1 CG associated with the SL HARQ feedback information, TB information associated with the SL HARQ feedback information, information on the number of retransmissions related to a SL HARQ process associated with the SL HARQ feedback information, information on the number of retransmissions related to a TB associated with the SL HARQ feedback information, information on the number of remaining retransmissions related to a SL HARQ process associated with the SL HARQ feedback information, and/or information on the remaining number of retransmissions related to a TB associated with the SL HARQ feedback information may be transmitted to the base station through the first resource.

FIG. 19 shows a method for a base station to receive SL HARQ feedback information from a first device, based on an embodiment of the present disclosure. The embodiment of FIG. 19 may be combined with various embodiments of the present disclosure.

Referring to FIG. 19, in step S1910, the base station may receive SL HARQ feedback information from the first device through a first resource. For example, the first resource may be a PUCCH resource. For example, if the number of retransmissions related to first sidelink information performed by the first device reaches the MAX_RETX-NUM, and if the first device determines that the first sidelink information is not successfully transmitted, the base station may receive ACK information or pre-configured state/indicator information from the first device through the first resource. For example, based on various embodiments of the present disclosure, the base station may receive SL HARQ feedback information from the first device through the first resource. For example, if the base station receives the SL HARQ feedback information from the first device through the first resource, at least one of identifier information of a SL HARQ process associated with the SL HARQ feedback information, an index of a mode 1 CG associated with the SL HARQ feedback information, TB information associated with the SL HARQ feedback information, information on the number of retransmissions related to a SL HARQ process associated with the SL HARQ feedback information, information on the number of retransmissions related to a TB associated with the SL HARQ feedback information, information on the number of remaining retransmissions related to a SL HARQ process associated with the SL HARQ feedback information, and/or information on the remaining number of retransmissions related to a TB associated with the SL HARQ feedback information may be received from the first device through the first resource.

Figure 20:
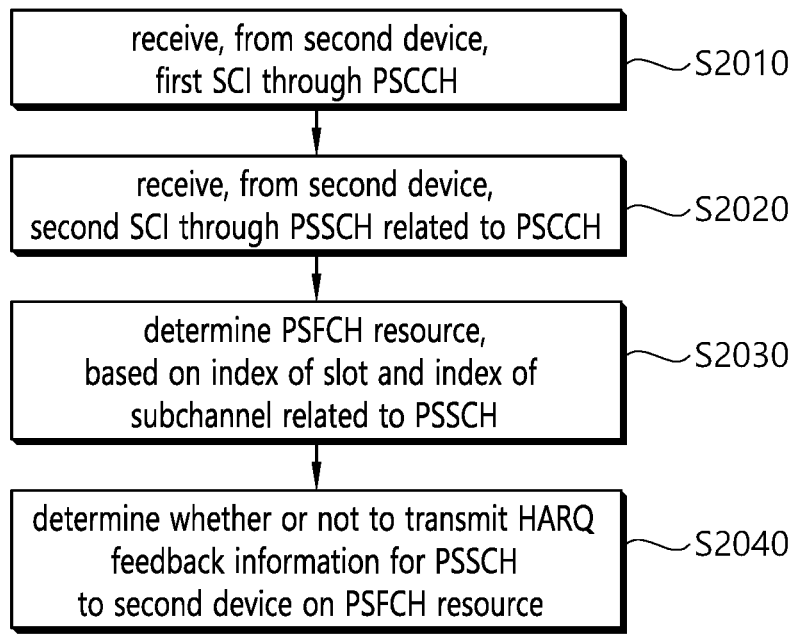
FIG. 20 shows a method for a first device to perform wireless communication, based on an embodiment of the present disclosure.

FIG. 20 shows a method for a first device to perform wireless communication, based on an embodiment of the present disclosure. The embodiment of FIG. 20 may be combined with various embodiments of the present disclosure.

Referring to FIG. 20, in step S2010, the first device may receive, from a second device, a first sidelink control information (SCI) through a physical sidelink control channel (PSCCH). In step S2020, the first device may receive, from the second device, a second SCI through a physical sidelink shared channel (PSSCH) related to the PSCCH. In step S2030, the first device may determine a physical sidelink feedback channel (PSFCH) resource, based on an index of a slot and an index of a subchannel related to the PSSCH. In step S2040, the first device may determine whether or not to transmit hybrid automatic repeat request (HARQ) feedback information for the PSSCH to the second device on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

For example, based on the format of the second SCI being the second format which includes the location information of the second device, the HARQ feedback information may include only NACK. For example, based on successful decoding of a transport block (TB) on the PSSCH by the first device, the HARQ feedback information may not be transmitted to the second device, and based on a failure of the first device to decode the TB on the PSSCH, the HARQ feedback information including the NACK may be transmitted to the second device. Additionally, for example, the first device may obtain a distance between the first device and the second device, based on the location information of the second device and location information of the first device. For example, the distance between the first device and the second device may be smaller than or equal to a communication range requirement. For example, information related to the communication range requirement may be included in the second SCI, and the format of the second SCI including the information related to the communication range requirement may be the second format.

For example, based on the format of the second SCI being the first format which does not include the location information of the second device, the HARQ feedback information may include the ACK or the NACK. For example, based on successful decoding of a transport block (TB) on the PSSCH by the first device, the HARQ feedback information including the ACK may be transmitted to the second device, and based on a failure of the first device to decode the TB on the PSSCH, the HARQ feedback information including the NACK may be transmitted to the second device. For example, based on successful decoding of a transport block (TB) on the PSSCH by the first device, the HARQ feedback information may not be transmitted to the second device, and based on a failure of the first device to decode the TB on the PSSCH, the HARQ feedback information including the NACK may be transmitted to the second device.

Additionally, for example, the first device may determine whether or not to perform a distance-based HARQ feedback operation, based on the format of the second SCI.

For example, based on the format of the second SCI being the second format including the location information of the second device, the first device may determine to perform the distance-based HARQ feedback operation. For example, based on successful decoding of a transport block (TB) on the PSSCH by the first device, the HARQ feedback information may not be transmitted to the second device, and based on a failure of the first device to decode the TB on the PSSCH and a distance between the first device and the second device being smaller than or equal to a communication range requirement, the HARQ feedback information including the NACK may be transmitted to the second device.

For example, based on the format of the second SCI being the first format which does not include the location information of the second device, the first device may determine not to perform the distance-based HARQ feedback operation.

For example, the location information of the second device may include an ID of a zone to which the second device belongs.

The proposed method can be applied to the device(s) described in the various embodiments of the present disclosure. First, the processor 102 of the first device 100 may control the transceiver 106 to receive, from a second device, a first sidelink control information (SCI) through a physical sidelink control channel (PSCCH). In addition, the processor 102 of the first device 100 may control the transceiver 106 to receive, from the second device, a second SCI through a physical sidelink shared channel (PSSCH) related to the PSCCH. In addition, the processor 102 of the first device 100 may determine a physical sidelink feedback channel (PSFCH) resource, based on an index of a slot and an index of a subchannel related to the PSSCH. In addition, the processor 102 of the first device 100 may determine whether or not to transmit hybrid automatic repeat request (HARQ) feedback information for the PSSCH to the second device on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device, a first sidelink control information (SCI) through a physical sidelink control channel (PSCCH); receive, from the second device, a second SCI through a physical sidelink shared channel (PSSCH) related to the PSCCH; determine a physical sidelink feedback channel (PSFCH) resource, based on an index of a slot and an index of a subchannel related to the PSSCH; and determine whether or not to transmit hybrid automatic repeat request (HARQ) feedback information for the PSSCH to the second device on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a second UE, a first sidelink control information (SCI) through a physical sidelink control channel (PSCCH); receive, from the second UE, a second SCI through a physical sidelink shared channel (PSSCH) related to the PSCCH; determine a physical sidelink feedback channel (PSFCH) resource, based on an index of a slot and an index of a subchannel related to the PSSCH; and determine whether or not to transmit hybrid automatic repeat request (HARQ) feedback information for the PSSCH to the second UE on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Based on an embodiment of the present disclosure, a non-transitory computer-readable storage medium storing instructions may be provided. For example, the instructions, when executed, may cause a first device to: receive, from a second device, a first sidelink control information (SCI) through a physical sidelink control channel (PSCCH); receive, from the second device, a second SCI through a physical sidelink shared channel (PSSCH) related to the PSCCH; determine a physical sidelink feedback channel (PSFCH) resource, based on an index of a slot and an index of a subchannel related to the PSSCH; and determine whether or not to transmit hybrid automatic repeat request (HARQ) feedback information for the PSSCH to the second device on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Figure 21:
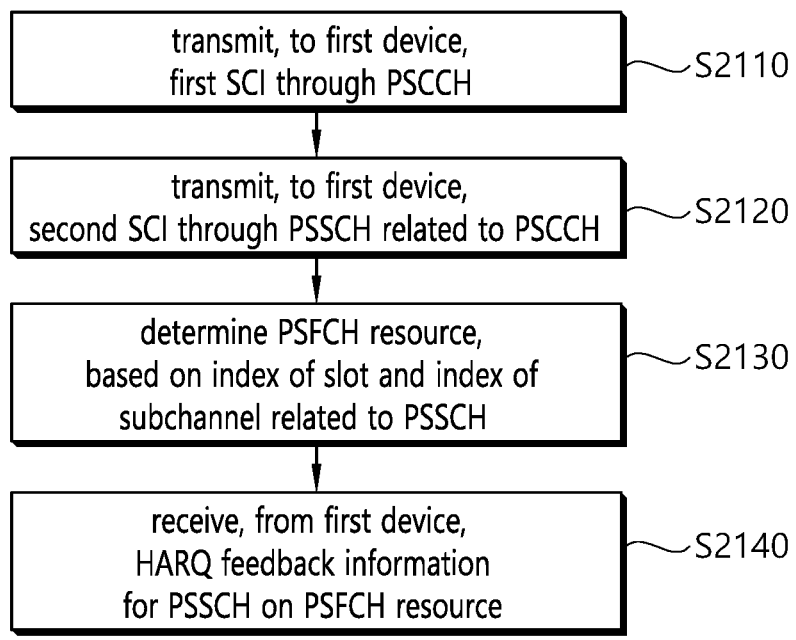
FIG. 21 shows a method for a second device to perform wireless communication, based on an embodiment of the present disclosure.

FIG. 21 shows a method for a second device to perform wireless communication, based on an embodiment of the present disclosure. The embodiment of FIG. 21 may be combined with various embodiments of the present disclosure.

Referring to FIG. 21, in step S2110, the second device may transmit, to a first device, a first sidelink control information (SCI) through a physical sidelink control channel (PSCCH). In step S2120, the second device may transmit, to the first device, a second SCI through a physical sidelink shared channel (PSSCH) related to the PSCCH. In step S2130, the second device may determine a physical sidelink feedback channel (PSFCH) resource, based on an index of a slot and an index of a subchannel related to the PSSCH. In step S2140, the second device may receive, from the first device, hybrid automatic repeat request (HARQ) feedback information for the PSSCH on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

The proposed method can be applied to the device(s) described in the various embodiments of the present disclosure. First, the processor 202 of the second device 200 may control the transceiver 206 to transmit, to a first device, a first sidelink control information (SCI) through a physical sidelink control channel (PSCCH). In addition, the processor 202 of the second device 200 may control the transceiver 206 to transmit, to the first device, a second SCI through a physical sidelink shared channel (PSSCH) related to the PSCCH. In addition, the processor 202 of the second device 200 may determine a physical sidelink feedback channel (PSFCH) resource, based on an index of a slot and an index of a subchannel related to the PSSCH. In addition, the processor 202 of the second device 200 may control the transceiver 206 to receive, from the first device, hybrid automatic repeat request (HARQ) feedback information for the PSSCH on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device, a first sidelink control information (SCI) through a physical sidelink control channel (PSCCH); transmit, to the first device, a second SCI through a physical sidelink shared channel (PSSCH) related to the PSCCH; determine a physical sidelink feedback channel (PSFCH) resource, based on an index of a slot and an index of a subchannel related to the PSSCH; and receive, from the first device, hybrid automatic repeat request (HARQ) feedback information for the PSSCH on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: transmit, to a first UE, a first sidelink control information (SCI) through a physical sidelink control channel (PSCCH); transmit, to the first UE, a second SCI through a physical sidelink shared channel (PSSCH) related to the PSCCH; determine a physical sidelink feedback channel (PSFCH) resource, based on an index of a slot and an index of a subchannel related to the PSSCH; and receive, from the first UE, hybrid automatic repeat request (HARQ) feedback information for the PSSCH on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Based on an embodiment of the present disclosure, a non-transitory computer-readable storage medium storing instructions may be provided. For example, the instructions, when executed, may cause a second device to: transmit, to a first device, a first sidelink control information (SCI) through a physical sidelink control channel (PSCCH); transmit, to the first device, a second SCI through a physical sidelink shared channel (PSSCH) related to the PSCCH; determine a physical sidelink feedback channel (PSFCH) resource, based on an index of a slot and an index of a subchannel related to the PSSCH; and receive, from the first device, hybrid automatic repeat request (HARQ) feedback information for the PSSCH on the PSFCH resource. For example, a format of the second SCI may be a first format which does not include location information of the second device or a second format which includes location information of the second device. For example, based on the format of the second SCI, the HARQ feedback information may include ACK or NACK, or may include only NACK.

Figure 22:
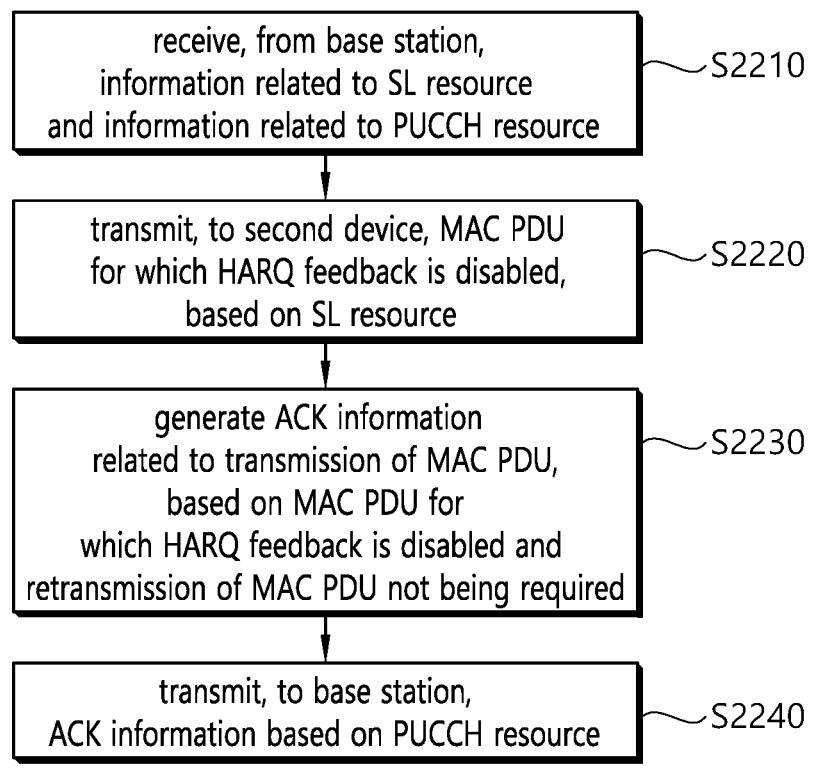
FIG. 22 shows a method for a first device to perform wireless communication, based on an embodiment of the present disclosure.

FIG. 22 shows a method for a first device to perform wireless communication, based on an embodiment of the present disclosure. The embodiment of FIG. 22 may be combined with various embodiments of the present disclosure.

Referring to FIG. 22, in step S2210, the first device may receive, from a base station, information related to a sidelink (SL) resource and information related to a physical uplink control channel (PUCCH) resource. In step S2220, the first device may transmit, to a second device, a medium access control (MAC) packet data unit (PDU) for which hybrid automatic repeat request (HARQ) feedback is disabled, based on the SL resource. In step S2230, the first device may generate ACK information related to transmission of the MAC PDU, based on the MAC PDU for which the HARQ feedback is disabled and retransmission of the MAC PDU not being required. In step S2240, the first device may transmit, to the base station, the ACK information based on the PUCCH resource.

Additionally, for example, the first device may receive, from the base station, information related to a maximum number of transmissions. For example, based on a number of transmissions of the MAC PDU which reaches the maximum number of transmissions, the retransmission of the MAC PDU may not be required. For example, based on a number of SL resources allocated by the base station being greater than the maximum number of transmissions, among the SL resources, a resource after the transmission of the ACK information may be released by the base station.

For example, based on blind retransmission of the MAC PDU being performed, the HARQ feedback may be disabled for the MAC PDU.

For example, a retransmission resource for the MAC PDU may not be allocated for the first device by the base station based on the ACK information.

For example, information related to a number of transmissions of the MAC PDU may be transmitted to the base station based on the PUCCH resource with the ACK information.

Additionally, for example, the first device may generate NACK information related to the transmission of the MAC PDU, based on the MAC PDU for which the HARQ feedback is disabled and the retransmission of the MAC PDU being required and no SL grant available for the retransmission of the MAC PDU, and the first device may transmit, to the base station, the NACK information based on the PUCCH resource. For example, a retransmission resource for the MAC PDU may be allocated to the first device by the base station based on the NACK information.

Additionally, for example, the first device may transmit, to the second device, a sidelink control information (SCI) including HARQ feedback disabled information representing disable of the HARQ feedback for the MAC PDU. For example, based on the HARQ feedback disabled information, the HARQ feedback for the MAC PDU may not be transmitted by the second device. Additionally, for example, the first device may measure a congestion level for a resource pool, and based on the congestion level being greater than a threshold, the HARQ feedback disabled information may be transmitted through the SCI. For example, based on a priority of the MAC PDU being lower than a pre-configured priority, the HARQ feedback disabled information may be transmitted through the SCI.

The proposed method can be applied to the device(s) described in the various embodiments of the present disclosure. First, the processor 102 of the first device 100 may control the transceiver 106 to receive, from a base station, information related to a sidelink (SL) resource and information related to a physical uplink control channel (PUCCH) resource. In addition, the processor 102 of the first device 100 may control the transceiver 106 to transmit, to a second device, a medium access control (MAC) packet data unit (PDU) for which hybrid automatic repeat request (HARQ) feedback is disabled, based on the SL resource. In addition, the processor 102 of the first device 100 may generate ACK information related to transmission of the MAC PDU, based on the MAC PDU for which the HARQ feedback is disabled and retransmission of the MAC PDU not being required. In addition, the processor 102 of the first device 100 may control the transceiver 106 to transmit, to the base station, the ACK information based on the PUCCH resource.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a base station, information related to a sidelink (SL) resource and information related to a physical uplink control channel (PUCCH) resource; transmit, to a second device, a medium access control (MAC) packet data unit (PDU) for which hybrid automatic repeat request (HARQ) feedback is disabled, based on the SL resource; generate ACK information related to transmission of the MAC PDU, based on the MAC PDU for which the HARQ feedback is disabled and retransmission of the MAC PDU not being required; and transmit, to the base station, the ACK information based on the PUCCH resource.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a sidelink (SL) resource and information related to a physical uplink control channel (PUCCH) resource; transmit, to a second UE, a medium access control (MAC) packet data unit (PDU) for which hybrid automatic repeat request (HARQ) feedback is disabled, based on the SL resource; generate ACK information related to transmission of the MAC PDU, based on the MAC PDU for which the HARQ feedback is disabled and retransmission of the MAC PDU not being required; and transmit, to the base station, the ACK information based on the PUCCH resource.

Based on an embodiment of the present disclosure, a non-transitory computer-readable storage medium storing instructions may be provided. For example, the instructions, when executed, may cause a second device to: receive, from a base station, information related to a sidelink (SL) resource and information related to a physical uplink control channel (PUCCH) resource; transmit, to a second device, a medium access control (MAC) packet data unit (PDU) for which hybrid automatic repeat request (HARQ) feedback is disabled, based on the SL resource; generate ACK information related to transmission of the MAC PDU, based on the MAC PDU for which the HARQ feedback is disabled and retransmission of the MAC PDU not being required; and transmit, to the base station, the ACK information based on the PUCCH resource.

Figure 23:
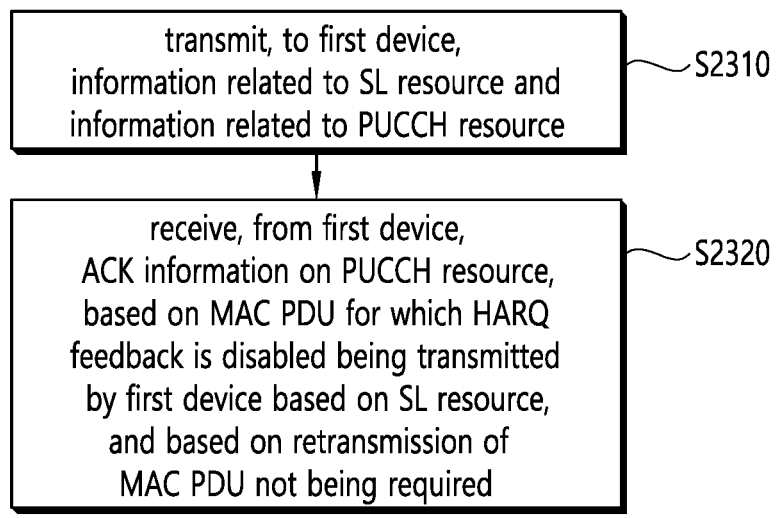
FIG. 23 shows a method for a base station to perform wireless communication, based on an embodiment of the present disclosure.

FIG. 23 shows a method for a base station to perform wireless communication, based on an embodiment of the present disclosure. The embodiment of FIG. 23 may be combined with various embodiments of the present disclosure.

Referring to FIG. 23, in step S2310, the base station may transmit, to a first device, information related to a sidelink (SL) resource and information related to a physical uplink control channel (PUCCH) resource. In step S2320, the base station may receive, from the first device, ACK information on the PUCCH resource, based on a medium access control (MAC) packet data unit (PDU) for which hybrid automatic repeat request (HARQ) feedback is disabled being transmitted by the first device based on the SL resource, and based on retransmission of the MAC PDU not being required.

The proposed method can be applied to the device(s) described in the various embodiments of the present disclosure. First, the processor 202 of the base station 200 may control the transceiver 206 to transmit, to a first device, information related to a sidelink (SL) resource and information related to a physical uplink control channel (PUCCH) resource. In addition, the processor 202 of the base station 200 may control the transceiver 206 to receive, from the first device, ACK information on the PUCCH resource, based on a medium access control (MAC) packet data unit (PDU) for which hybrid automatic repeat request (HARQ) feedback is disabled being transmitted by the first device based on the SL resource, and based on retransmission of the MAC PDU not being required.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a sidelink (SL) resource and information related to a physical uplink control channel (PUCCH) resource; and receive, from the first device, ACK information on the PUCCH resource, based on a medium access control (MAC) packet data unit (PDU) for which hybrid automatic repeat request (HARQ) feedback is disabled being transmitted by the first device based on the SL resource, and based on retransmission of the MAC PDU not being required.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a sidelink (SL) resource and information related to a physical uplink control channel (PUCCH) resource; and receive, from the first UE, ACK information on the PUCCH resource, based on a medium access control (MAC) packet data unit (PDU) for which hybrid automatic repeat request (HARQ) feedback is disabled being transmitted by the first UE based on the SL resource, and based on retransmission of the MAC PDU not being required.

Based on an embodiment of the present disclosure, a non-transitory computer-readable storage medium storing instructions may be provided. For example, the instructions, when executed, may cause a base station to: transmit, to a first device, information related to a sidelink (SL) resource and information related to a physical uplink control channel (PUCCH) resource; and receive, from the first device, ACK information on the PUCCH resource, based on a medium access control (MAC) packet data unit (PDU) for which hybrid automatic repeat request (HARQ) feedback is disabled being transmitted by the first device based on the SL resource, and based on retransmission of the MAC PDU not being required.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
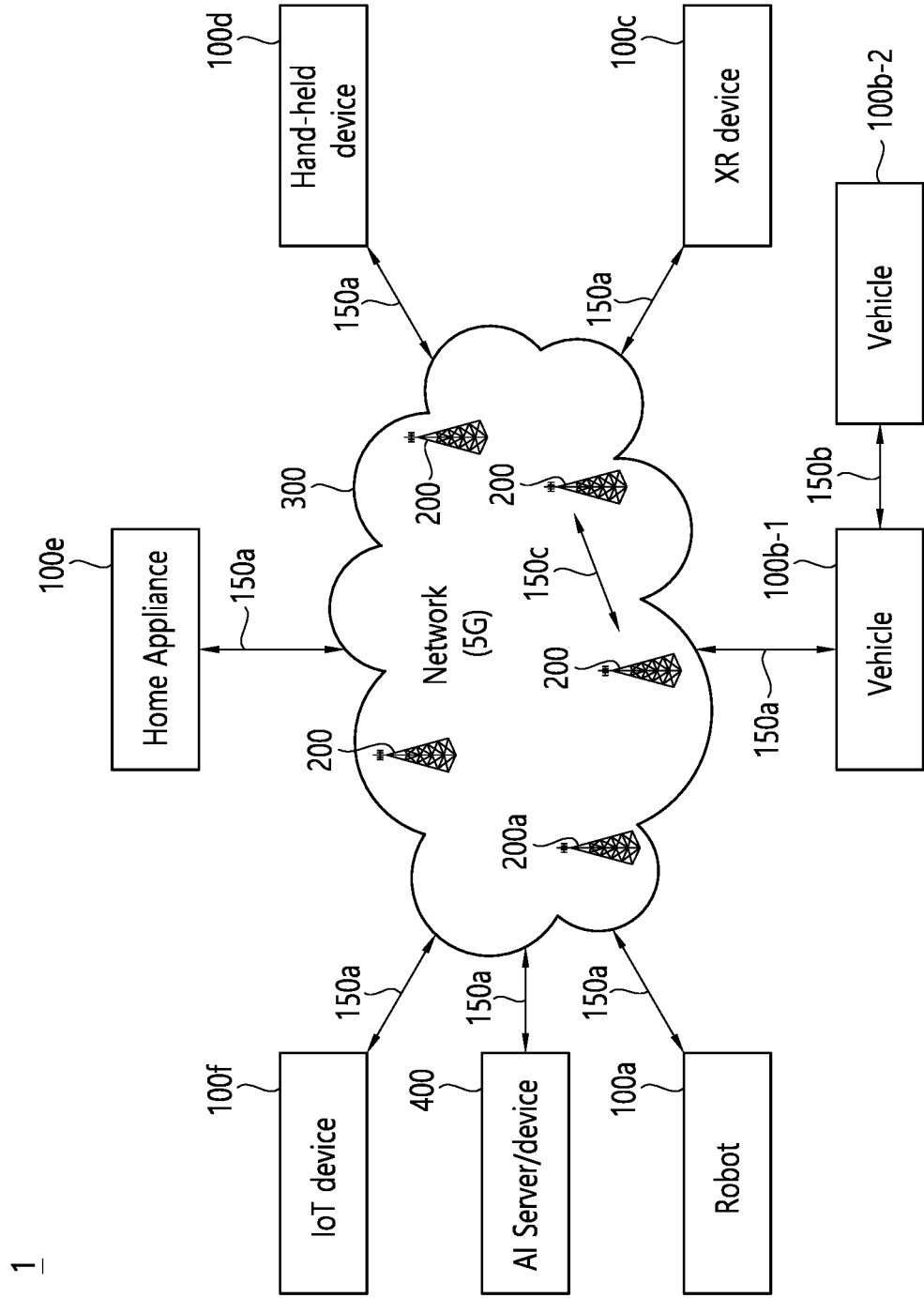
FIG. 24 shows a communication system 1, based on an embodiment of the present disclosure.

FIG. 24 shows a communication system 1, based on an embodiment of the present disclosure.

Referring to FIG. 24, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
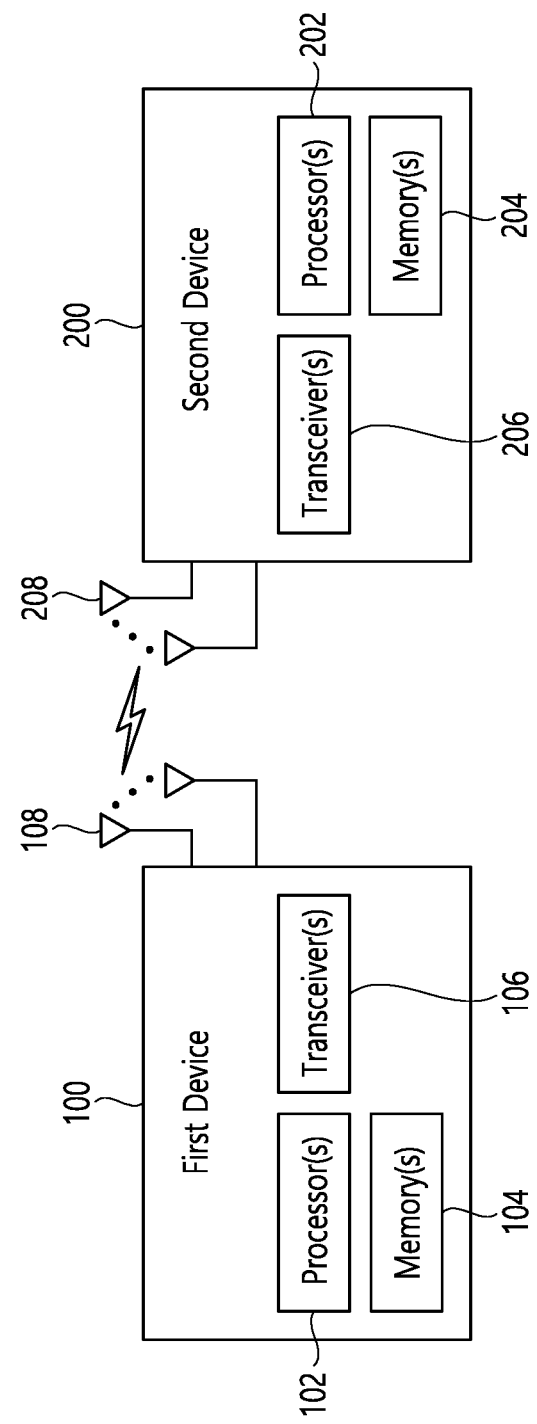
FIG. 25 shows wireless devices, based on an embodiment of the present disclosure.

FIG. 25 shows wireless devices, based on an embodiment of the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 26:
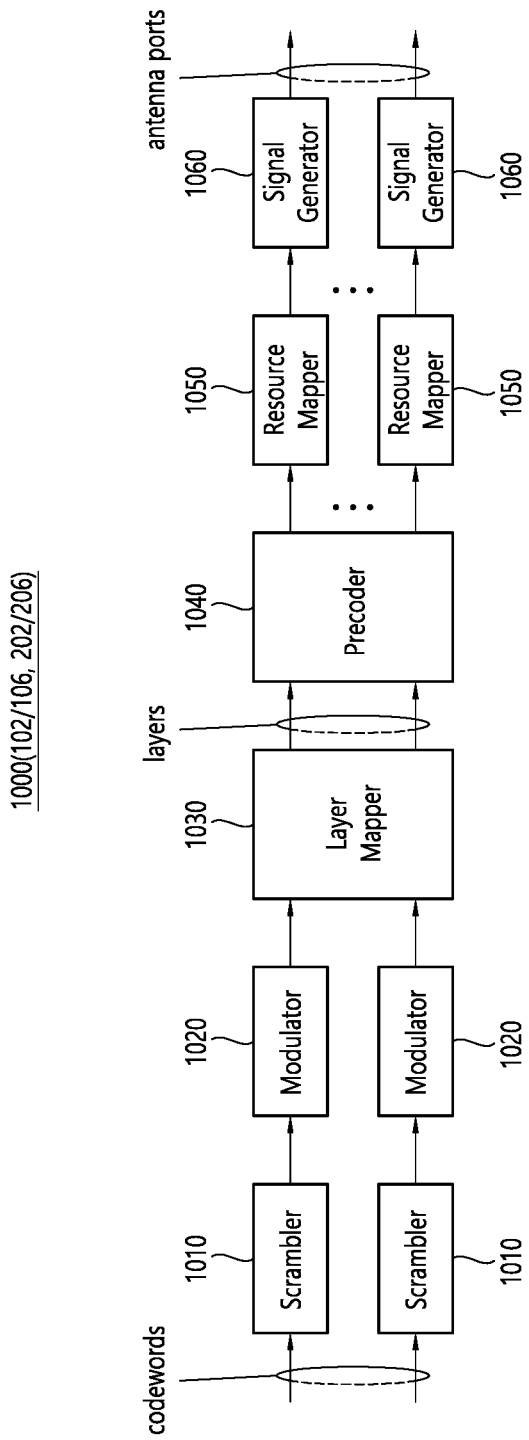
FIG. 26 shows a signal process circuit for a transmission signal, based on an embodiment of the present disclosure.

FIG. 26 shows a signal process circuit for a transmission signal, based on an embodiment of the present disclosure.

Referring to FIG. 26, a signal processing circuit 1000 may include scramblers 1010, modulators 1020, a layer mapper 1030, a precoder 1040, resource mappers 1050, and signal generators 1060. An operation/function of FIG. 26 may be performed, without being limited to, the processors 102 and 202 and/or the transceivers 106 and 206 of FIG. 25. Hardware elements of FIG. 26 may be implemented by the processors 102 and 202 and/or the transceivers 106 and 206 of FIG. 25. For example, blocks 1010 to 1060 may be implemented by the processors 102 and 202 of FIG. 25. Alternatively, the blocks 1010 to 1050 may be implemented by the processors 102 and 202 of FIG. 25 and the block 1060 may be implemented by the transceivers 106 and 206 of FIG. 25.

Codewords may be converted into radio signals via the signal processing circuit 1000 of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 26. For example, the wireless devices (e.g., 100 and 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 27:
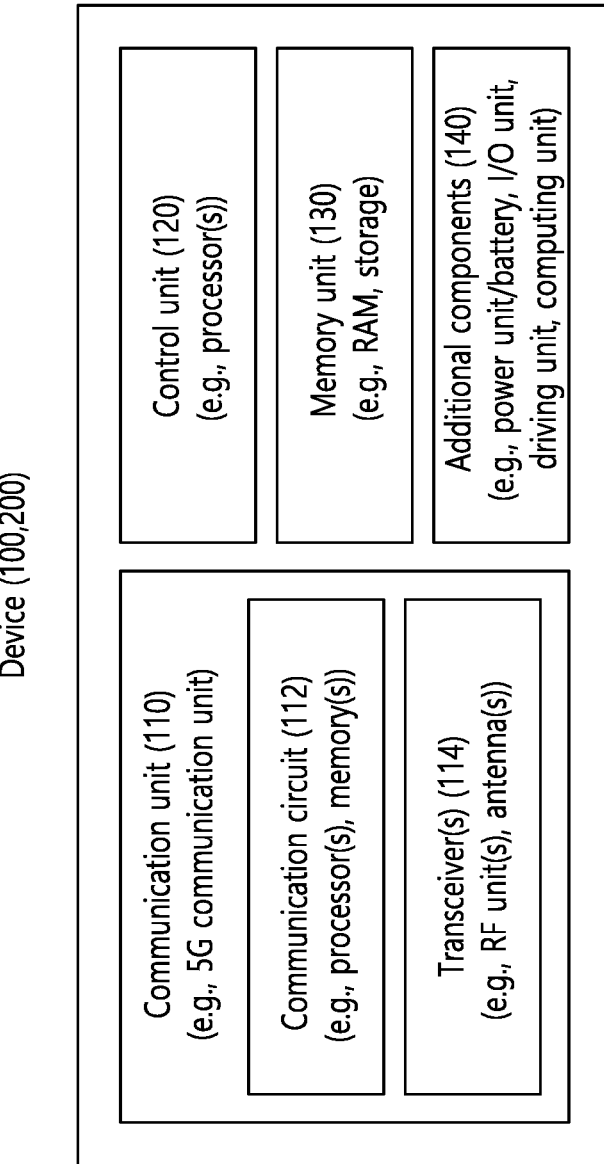
FIG. 27 shows another example of a wireless device, based on an embodiment of the present disclosure.

FIG. 27 shows another example of a wireless device, based on an embodiment of the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Figure 28:
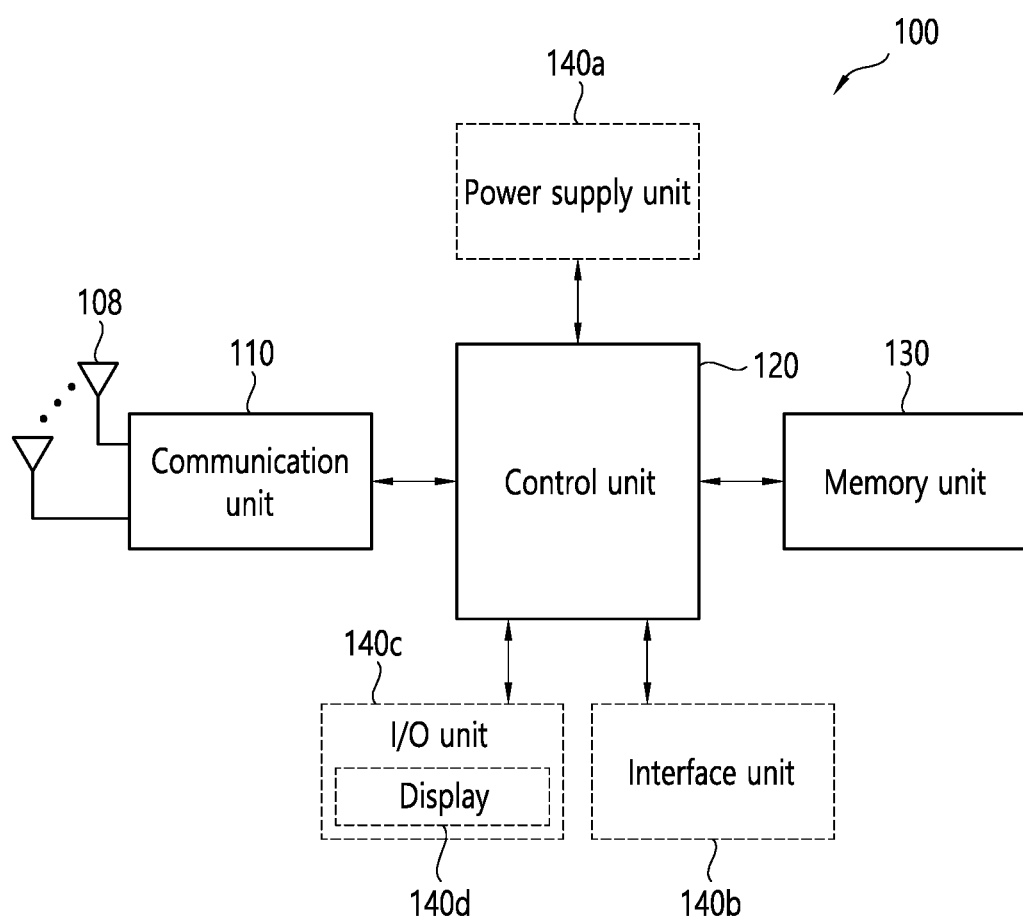
FIG. 28 shows a hand-held device, based on an embodiment of the present disclosure.

FIG. 28 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 27, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 29:
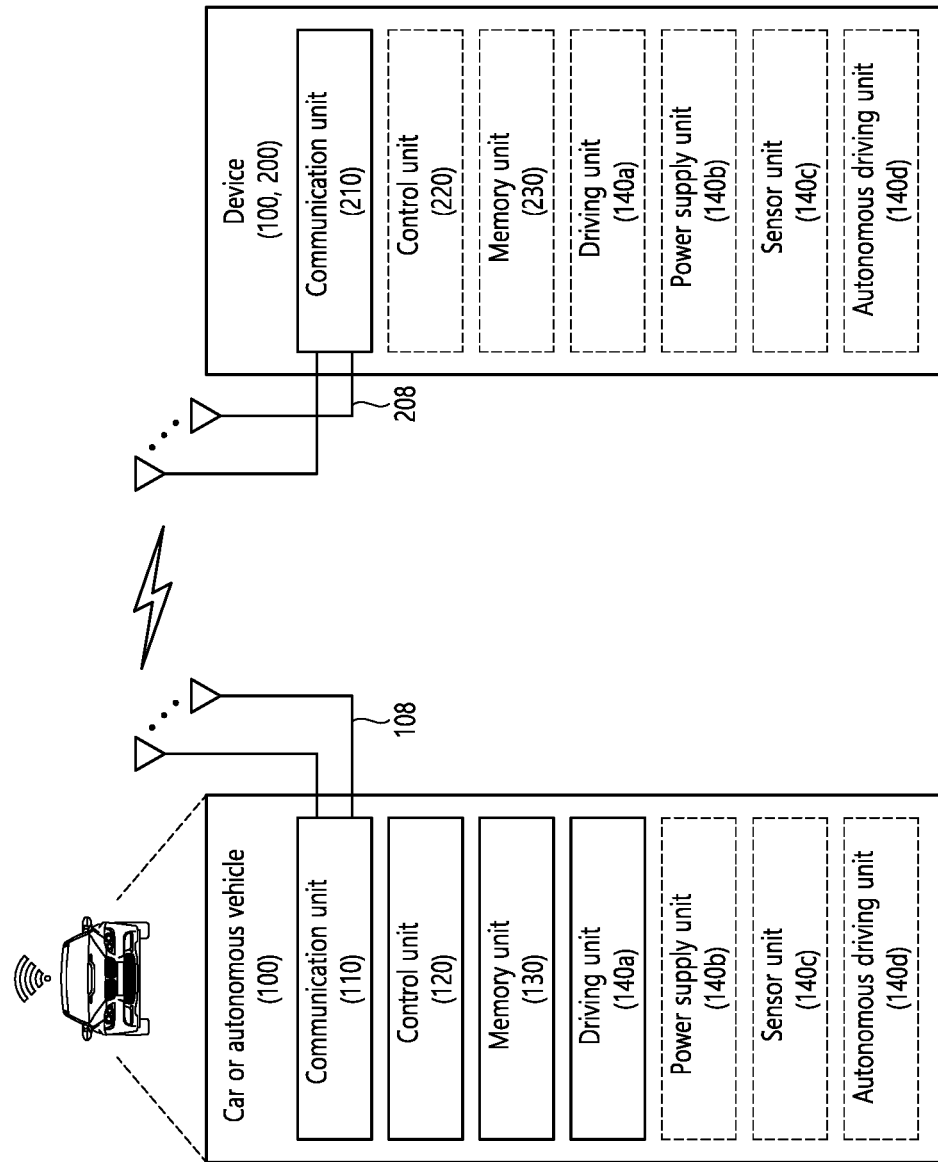
FIG. 29 shows a vehicle or an autonomous vehicle, based on an embodiment of the present disclosure.

FIG. 29 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 29, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    receiving, from a second device, first sidelink control information (SCI) through a physical sidelink control channel (PSCCH); and
    receiving, from the second device, second SCI and data through a physical sidelink shared channel (PSSCH) related to the PSCCH,
    wherein, based on that a format of the second SCI is a first format used for distance-based negative-only hybrid automatic repeat request (HARQ) feedback, the second SCI includes zone identity (ID).

2. The method of claim 1, wherein, based on that the format of the second SCI is a second format not used for the distance-based negative-only HARQ feedback, the second SCI includes no zone ID.

3. The method of claim 1, wherein the zone ID is an identity of a zone in which the second device is located.

4. The method of claim 1, wherein negative-only HARQ feedback is enabled by the second SCI.

5. The method of claim 4, further comprising:
    obtaining a distance based on the zone ID included in the second SCI and location information of the first device; and
    generating a negative acknowledgement of the data, based on that (i) the distance is smaller than or equal to a communication range requirement and (ii) the first device fails to decode the data,
    wherein the negative acknowledgement of the data is not generated, based on that (i) the distance is not smaller than or equal to the communication range requirement and (ii) the first device fails to decode the data.

6. The method of claim 5, wherein the communication range requirement is included in the second SCI including the zone ID.

7. The method of claim 4, further comprising:
    determining a physical sidelink feedback channel (PSFCH) resource, based on a slot and a subchannel allocated for the PSSCH; and
    transmitting, to the second device, the negative acknowledgement of the data based on the PSFCH resource.

8. The method of claim 1,
    wherein the format of the second SCI is the first format used for the distance-based negative-only HARQ feedback or a second format used for postive-negative HARQ feedback or negative-only HARQ feedback; and
    wherein a size of the second format used for the positive-negative HARQ feedback is equal to a size of the second format used for the negative-only HARQ feedback, and the size of the second format used for the negative-only HARQ feedback is different from a size of the first format used for the distance-based negative-only HARQ feedback.

9. The method of claim 1, wherein, based on successful decoding of the data by the first device, a positive acknowledgement of the data is not generated.

10. The method of claim 1, further comprising:
determining that the distance-based negative-only HARQ feedback is enabled based on that the format of the second SCI is the first format.

11. A first device adapted to perform wireless communication, the first device comprising:
at least one transceiver;
at least one processor; and
at least one memory connected to the at least one processor and storing instructions that, based on being executed, cause the at least one processor to perform operations comprising:
receiving, from a second device, first sidelink control information (SCI) through a physical sidelink control channel (PSCCH); and
receiving, from the second device, second SCI and data through a physical sidelink shared channel (PSSCH) related to the PSCCH,
wherein, based on that a format of the second SCI is a first format used for distance-based negative-only hybrid automatic repeat request (HARQ) feedback, the second SCI includes zone identity (ID).

12. The first device of claim 11, wherein, based on that the format of the second SCI is a second format not used for the distance-based negative-only HARQ feedback, the second SCI includes no zone ID.

13. The first device of claim 11, wherein the zone ID is an identity of a zone in which the second device is located.

14. The first device of claim 11, wherein negative-only HARQ feedback is enabled by the second SCI.

15. The first device of claim 11,
wherein the format of the second SCI is the first format used for the distance-based negative-only HARQ feedback or a second format used for positive-negative HARQ feedback or negative-only HARQ feedback, and
wherein a size of the second format used for the positive-negative HARQ feedback is equal to a size of the second format used for the negative-only HARQ feedback, and the size of the second format used for the negative-only HARQ feedback is different from a size of the first format used for the distance-based negative-only HARQ feedback.

16. A processing device adapted to control a first device performing wireless communication, the processing device comprising:
at least one processor; and
at least one memory connected to the at least one processor and storing instructions that, based on being executed, cause the at least one processor to perform operations comprising:
receiving, from a second device, first sidelink control information (SCI) through a physical sidelink control channel (PSCCH); and
receiving, from the second device, second SCI and data through a physical sidelink shared channel (PSSCH) related to the PSCCH,
wherein, based on that a format of the second SCI is a first format used for distance-based negative-only hybrid automatic repeat request (HARQ) feedback, the second SCI includes zone identity (ID).

17. The processing device of claim 16, wherein, based on that the format of the second SCI is a second format not used for the distance-based negative-only HARQ feedback, the second SCI includes no zone ID.

18. The processing device of claim 16, wherein the zone ID is an identity of a zone in which the second device is located.

19. The processing device of claim 16, wherein negative-only HARQ feedback is enabled by the second SCI.

20. The processing device of claim 16,
wherein the format of the second SCI is the first format used for the distance-based negative-only HARQ feedback or a second format used for positive-negative HARQ feedback or negative-only HARQ feedback, and
wherein a size of the second format used for the positive-negative HARQ feedback is equal to a size of the second format used for the negative-only HARQ feedback, and the size of the second format used for the negative-only HARQ feedback is different from a size of the first format used for the distance-based negative-only HARQ feedback.

* * * * *